(12) United States Patent
Kempf et al.

(10) Patent No.: US 11,263,204 B2
(45) Date of Patent: Mar. 1, 2022

(54) METHOD AND APPARATUS FOR MANAGING CLOUD SERVICES USING SMART CONTRACTS AND BLOCKCHAINS

(71) Applicant: Telefonaktiebolaget LM Ericsson (publ), Stockholm (SE)

(72) Inventors: James Kempf, Mountain View, CA (US); Nanjangud Chandrasekhara Swamy Narendra, Bangalore (IN); Sambit Nayak, Orissa (IN); Anshu Shukla, Bangalore (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 56 days.

(21) Appl. No.: 16/959,661

(22) PCT Filed: Apr. 17, 2018

(86) PCT No.: PCT/IB2018/052668
§ 371 (c)(1),
(2) Date: Jul. 1, 2020

(87) PCT Pub. No.: WO2019/155268
PCT Pub. Date: Aug. 15, 2019

(65) Prior Publication Data
US 2021/0081404 A1    Mar. 18, 2021

Related U.S. Application Data

(60) Provisional application No. 62/627,105, filed on Feb. 6, 2018.

(51) Int. Cl.
*G06F 21/00* (2013.01)
*G06F 16/23* (2019.01)
(Continued)

(52) U.S. Cl.
CPC ........ *G06F 16/2379* (2019.01); *H04L 9/0637* (2013.01); *H04L 9/0891* (2013.01);
(Continued)

(58) Field of Classification Search
CPC . G06F 16/2379; H04L 9/0637; H04L 9/0891; H04L 9/3073; H04L 9/321; H04L 2209/38; H04L 2209/56; H04L 9/3239
See application file for complete search history.

(56) References Cited

U.S. PATENT DOCUMENTS

2008/0244607 A1   10/2008  Rysin et al.
2011/0213712 A1    9/2011  Hadar et al.
(Continued)

FOREIGN PATENT DOCUMENTS

| WO | 2017/054985 A1 | 4/2017 |
| WO | 2019/130051 A1 | 7/2019 |
| WO | 2019/150176 A1 | 8/2019 |

OTHER PUBLICATIONS

Andersen et al., "Democratizing Authority in the Built Environment", Proceedings of the 4th International Conference on Systems for Energy-Efficient Built Environments, BuildSys, ACM, Nov. 8-9, 2017, 10 pages.

(Continued)

*Primary Examiner* — Mahfuzur Rahman
(74) *Attorney, Agent, or Firm* — Christopher & Weisberg, P.A.

(57) ABSTRACT

Methods and systems are disclosed for managing cloud services using smart contracts to facilitate various functions, such as tenant login, tenant enrollment, service registration, tenant usage charging, tenant usage tracking, tenant quota management, and tenant rights revocation. The proposed techniques allow tenant and service accounts to be represented as smart contracts, and for services to delegate (Continued)

authorization for bundles of service attributes to tenants and other services, for which the tenants and services are then charged. The business logic is implemented on a permissioned, distributed ledger (e.g., a private blockchain) and therefore is easily customized for specific classes of tenants and services.

17 Claims, 15 Drawing Sheets

(51) Int. Cl.
| | | |
|---|---|---|
| *H04L 9/06* | (2006.01) | |
| *H04L 9/08* | (2006.01) | |
| *H04L 9/30* | (2006.01) | |
| *H04L 9/32* | (2006.01) | |

(52) U.S. Cl.
CPC ............ *H04L 9/3073* (2013.01); *H04L 9/321* (2013.01); *H04L 2209/38* (2013.01)

(56) References Cited

U.S. PATENT DOCUMENTS

| | | | |
|---|---|---|---|
| 2018/0314809 A1* | 11/2018 | Mintz ................... | H04L 9/3236 |
| 2019/0058709 A1 | 2/2019 | Kempf et al. | |
| 2019/0372786 A1* | 12/2019 | Ra ....................... | H04W 12/084 |
| 2021/0049846 A1* | 2/2021 | Kashi .................. | G07C 9/00912 |
| 2021/0075870 A1* | 3/2021 | Kempf .................. | G06F 21/602 |

OTHER PUBLICATIONS

Andersen et al., "WAVE: A Decentralized Authorization System for IoT via Blockchain Smart Contracts", Technical Report No. UCB/EECS-2017-234, Dec. 29, 2017, 18 pages.

Arm Limited, "ARM TechCon", IdBrokering_ARM_TechCon_ehakeng_v4.ppt, Hakan Englund, 2017, 5 pages.

Arm TechCon, "Arm TechCon 2017 Schedule", Brokering of IoT Identities, available online at <http://schedule.armtechcon.com/session/brokering-of-iot-identities/850372>, 2017, 3 pages.

Ethereum, "Solidity", available online at < https://solidity.readthedocs.io/en/develop/>, 2016-2017, 5 pages.

JSON, "Introducing JSON", ECMA-404, available online at <https://web.archive.org/web/20200101045049/https://www.json.org/json-en.html>, Jan. 1, 2020, 8 pages.

Marley Gray, Introducing Project "Bletchley", Github, available online at <https://github.com/Azure/azure-blockchain-projects/blob/73148fe77023f7e1303fcceb66800f92862f0035/bletchley/bletchley-whitepaper.md>, Apr. 9, 2017, 17 pages.

Openstack, "Openstack docs: Authorization", available online at <https://docs.openstack.org/security-guide/identity/authorization.html>, Nov. 3, 2017, 4 pages.

Provisional U.S. Appl. No. 62/546,225, filed Aug. 16, 2017, 47 pages.

Sawtooth, "Hyperledger Sawtooth documentation: Overview", v0.8 Documentation, Available Online at <https://sawtooth.hyperledger.org/docs/core/releases/0.8.8/>, 2015, 2 pages.

Sebastián Peyrott, "Authentication: Ethereum and Smart Contracts, Part 3", DZone Security, available online at <https://dzone.com/articles/authentication-ethereum-and-smart-contracts-part-3>, Jun. 8, 2017, 6 pages.

U-port, "uPort: Self-Sovereign Identity", available online at <https://www.uport.me>, retrieved on Nov. 3, 2017, 4 pages.

Web3.py, "Web3.py: Contents", 3.16 Documentation, Available Online at <https://web3py.readthedocs.io/en/latest/>, 2017, 2 pages.

Wikipedia, "Uniform Resource Identifier", available online at <https://en.wikipedia.org/wiki/Uniform_Resource_ldentifier>, retrieved on Nov. 3, 2017, 9 pages.

* cited by examiner

```
┌─────────────────────────────────────────────────────────────────────────────┐
│  RECEIVE AN IDENTIFICATION THAT UNIQUELY IDENTIFIES THE SERVICE AND A        │
│            DESCRIPTION OF A SET OF ONE OR MORE RESOURCES OFFERED BY          │
│                                 THE SERVICE                                  │
│                                     702                                      │
│  ┌───────────────────────────────────────────────────────────────────────┐  │
│  │     THE IDENTIFICATION OF THE SERVICE INCLUDES A FIRST IDENTIFIER     │  │
│  │   THAT IS A CRYPTOGRAPHIC PUBLIC KEY FROM THE CRYPTOGRAPHIC PUBLIC-   │  │
│  │   PRIVATE KEY PAIR OF THE SERVICE, AND THE IDENTIFICATION OF THE      │  │
│  │   TENANT AND SERVICE MANAGEMENT SYSTEM IS A CRYPTOGRAPHIC PUBLIC KEY  │  │
│  │   FROM THE CRYPTOGRAPHIC PUBLIC-PRIVATE KEY PAIR OF THE TENANT AND    │  │
│  │                       SERVICE MANAGEMENT SYSTEM                       │  │
│  │                                  712                                  │  │
│  └───────────────────────────────────────────────────────────────────────┘  │
│                                                                              │
│  ┌───────────────────────────────────────────────────────────────────────┐  │
│  │  THE IDENTIFICATION OF THE SERVICE FURTHER INCLUDES A SECOND          │  │
│  │  IDENTIFIER ASSIGNED TO THE SERVICE THAT IS IN A HUMAN READABLE       │  │
│  │  FORMAT AND THAT IS DIFFERENT FROM THE CRYPTOGRAPHIC PUBLIC KEY OF    │  │
│  │                             THE SERVICE                               │  │
│  │                                  714                                  │  │
│  └───────────────────────────────────────────────────────────────────────┘  │
└─────────────────────────────────────────────────────────────────────────────┘
                                       │
                                       ▼
┌─────────────────────────────────────────────────────────────────────────────┐
│   RECORD INTO THE BLOCKCHAIN DATABASE A SMART DELEGATION CONTRACT BETWEEN    │
│   THE SERVICE AND THE TENANT AND SERVICE MANAGEMENT SYSTEM, WHERE THE        │
│   SMART DELEGATION CONTRACT INCLUDES AN IDENTIFICATION OF THE SERVICE, AN    │
│   IDENTIFICATION OF THE TENANT AND SERVICE MANAGEMENT SYSTEM, AND THE        │
│   DESCRIPTION OF THE SET OF RESOURCES, AND THE SMART DELEGATION CONTRACT     │
│   IS CRYPTOGRAPHICALLY SIGNED WITH A CRYPTOGRAPHIC PRIVATE KEY OF THE        │
│   SERVICE THAT IS PART OF A CRYPTOGRAPHIC PUBLIC-PRIVATE KEY PAIR OF THE     │
│   SERVICE AND WITH A CRYPTOGRAPHIC PRIVATE KEY OF THE TENANT AND SERVICE     │
│   MANAGEMENT SYSTEM THAT IS PART OF A CRYPTOGRAPHIC PUBLIC-PRIVATE KEY       │
│              PAIR FOR THE TENANT AND SERVICE MANAGEMENT SYSTEM               │
│                                     704                                      │
└─────────────────────────────────────────────────────────────────────────────┘
                                       │
                                       ▼
┌─────────────────────────────────────────────────────────────────────────────┐
│            RECEIVE FROM A REQUESTOR A REQUEST TO ACCESS THE SERVICE          │
│                                     706                                      │
└─────────────────────────────────────────────────────────────────────────────┘
                                       │
                                       ▼
┌─────────────────────────────────────────────────────────────────────────────┐
│   AUTHORIZE THE REQUESTOR TO ACCESS THE SERVICE BASED AT LEAST IN PART ON    │
│   THE SMART DELEGATION CONTRACT BETWEEN THE SERVICE AND THE TENANT AND       │
│                         SERVICE MANAGEMENT SYSTEM                            │
│                                     708                                      │
└─────────────────────────────────────────────────────────────────────────────┘
```

Figure 7

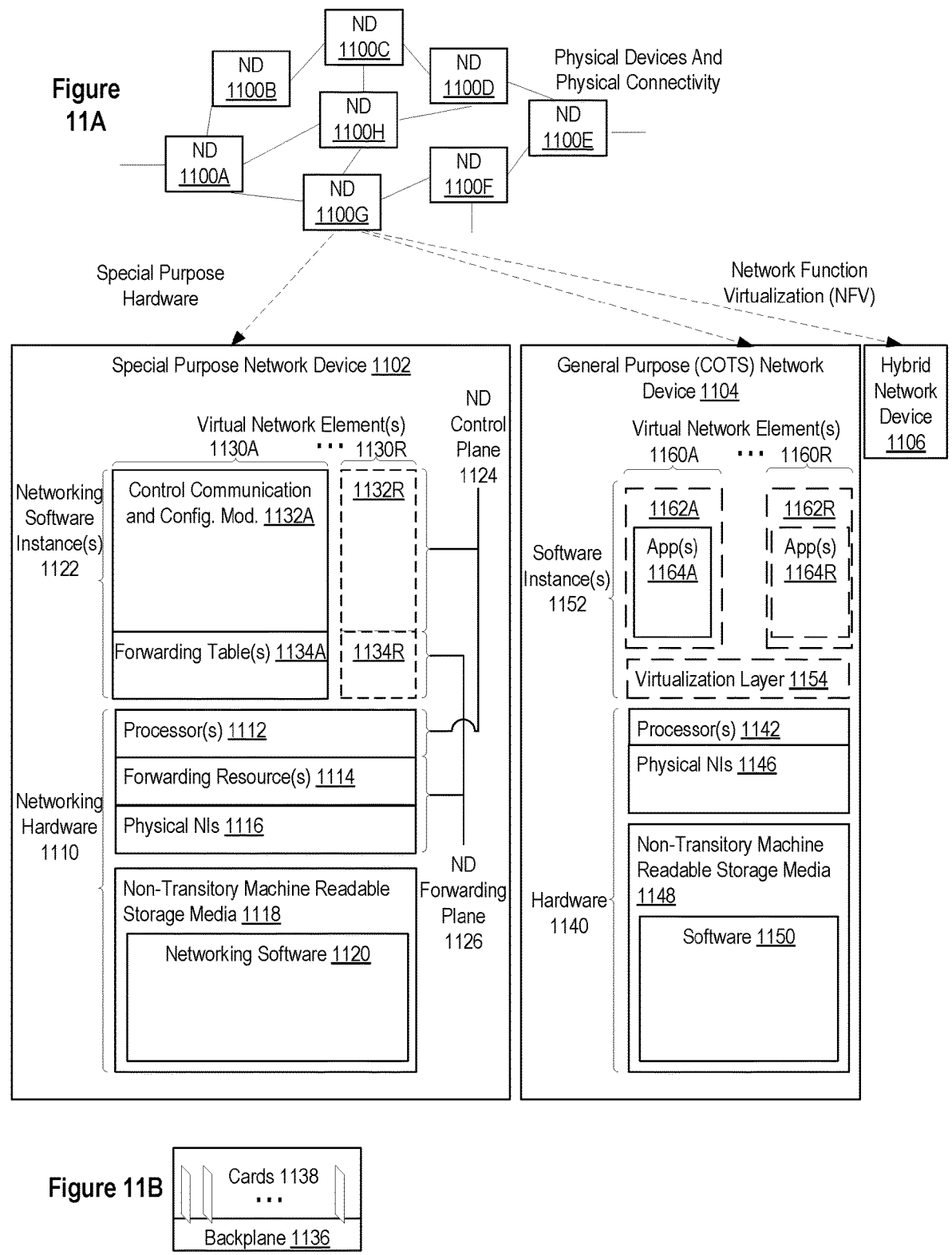

us 11,263,204 B2

METHOD AND APPARATUS FOR MANAGING CLOUD SERVICES USING SMART CONTRACTS AND BLOCKCHAINS

CROSS-REFERENCE TO RELATED APPLICATIONS

This application is a National stage of International Application No. PCT/IB2018/052668, filed Apr. 17, 2018, which claims the benefit of U.S. Provisional Application No. 62/627,105, filed Feb. 6, 2018, which are hereby incorporated by reference.

TECHNICAL FIELD

Embodiments of the invention relate to the field of data center architecture; and more specifically, to the management of cloud services using smart contracts.

BACKGROUND ART

A multi-tenant data center infrastructure supports one or multiple services that are made available to users. The services hosted in a data center can include Infrastructure as a Service (IaaS), which provides access to computing resources (e.g., processing power, data storage capacity, and networking resources); Platform as a Service (PaaS), which provides a development platform layer (e.g., web servers, database management systems, and software development kits (SDKs)) in addition to computing and storage infrastructure; and Software as a Service (SaaS), which provides application-level services tailored to a range of business needs.

Existing cloud service providers utilize centralized database systems for managing compute, storage, and networking services, as well as third party services like streaming media offered through the cloud provider. A user of the data center can be a tenant (e.g., an external organization with one or more users, or an external individual user) interested in using the services of the cloud-based architecture. Additionally, the user can be a service of the architecture that needs to access one or more other services of the cloud-based architecture.

Centralized database systems require much effort to configure a customized service offering for specific customer classes, for example a specific kind of business like construction. Because databases allow records to be removed, in the event that there is a dispute and the relevant records were removed through some error or intent, the customer has little recourse. This is a particular problem in regulated industries like finance and health care.

SUMMARY

Aspects include techniques, using smart contracts, for managing cloud services. In particular, methods are disclosed for using smart contracts to facilitate various functions, such as tenant login, tenant enrollment, service registration, tenant usage charging, tenant usage tracking, tenant quota management, and tenant rights revocation.

The proposed scheme is an extension of the blockchain tenant management described in U.S. patent application Ser. No. 15/846,911, filed Dec. 19, 2017, entitled "Tenant Management Method and System in a Cloud Computing Environment," that includes service integration and charging for services as well as for tenants. It represents tenants and services accounts in the form of smart contracts running on a permissioned, distributed ledger (e.g., a private blockchain). To enable this provisioning, the proposed system incorporates the following features:

Tenant enrollment

Service registration into the cloud system so that it is available to tenants

Tenant charging

Tenant usage tracking

Tenant quota update based on request from tenant, subject to availability in the cloud system In addition, the system supports delegation of rights from service to tenants and revocation of those rights. These functions are described in International Application No. PCT/IB2018/050713, filed Feb. 5, 2018, entitled "Method and Apparatus for Managing Service Access Authorization Using Smart Contracts" (referred to hereinafter as "PCT/IB2018/050713").

Because the blockchain records are immutable, the proposed solution provides a method whereby tenants and services can request auditing of transactions in the event of a dispute. In addition, service providers, both the cloud service provider and third party service providers, can offer customized service offerings to particular classes of customers through the following functionality:

A smart contract between the tenant and the cloud system, enabled via delegating authorization rights to the tenant for usage of requested cloud services Fine-grained tracking of service usage by the tenant, including charging. In some embodiments, cryptocurrency can be used for charging, though that is not required.

Tenant quota update as per tenant request.

One general aspect includes a method in a tenant and service management system of a data center of managing access to one or more services by a plurality of users, the method including: receiving an identification that uniquely identifies a service and a description of a set of one or more resources offered by the service; recording into a blockchain database a smart delegation contract between the service and the tenant and service management system, where the smart delegation contract includes the identification of the service, an identification of the tenant and service management system, and the description of the set of resources, and the smart delegation contract is cryptographically signed with a cryptographic private key of the service that is part of a cryptographic public-private key pair for the service and with a cryptographic private key of the tenant and service management system that is part of a cryptographic public-private key pair for the tenant and service management system; receiving from a requestor a request to access the service; and authorizing the requestor to access the service based at least in part on the smart delegation contract between the service and the tenant and service management system.

One general aspect includes a server including a tenant and service management system in a data center for managing access to one or more services by a plurality of users, the server including: a non-transitory computer readable medium to store instructions; and a processor coupled with the non-transitory computer readable storage medium to process the stored instructions to: receive an identification that uniquely identifies a service and a description of a set of one or more resources offered by the service; record into a blockchain database a smart delegation contract between the service and the tenant and service management system, where the smart delegation contract includes the identification of the service, an identification of the tenant and service management system, and the description of the set of resources, and the smart delegation contract is cryptographically signed with a cryptographic private key of the service that is part of a cryptographic public-private key pair for the service and with a cryptographic private key of the tenant and service management system that is part of a cryptographic public-private key pair for the tenant and service management system; receive from a requestor a request to access the service; and authorize the requestor to access the service based at least in part on the smart delegation contract between the service and the tenant and service management system.

BRIEF DESCRIPTION OF THE DRAWINGS

The invention may best be understood by referring to the following description and accompanying drawings that are used to illustrate embodiments of the invention. In the drawings:

FIG. 7 illustrates a flow diagram of exemplary operations performed by a tenant and service management system of a data center for managing access to one or more services in accordance with some embodiments;

FIG. 11A illustrates connectivity between network devices (NDs) within an exemplary network, as well as three exemplary implementations of the NDs, according to some embodiments of the invention; and FIG. 11B illustrates an exemplary way to implement a special-purpose network device according to some embodiments of the invention.

DETAILED DESCRIPTION

Figure 1:
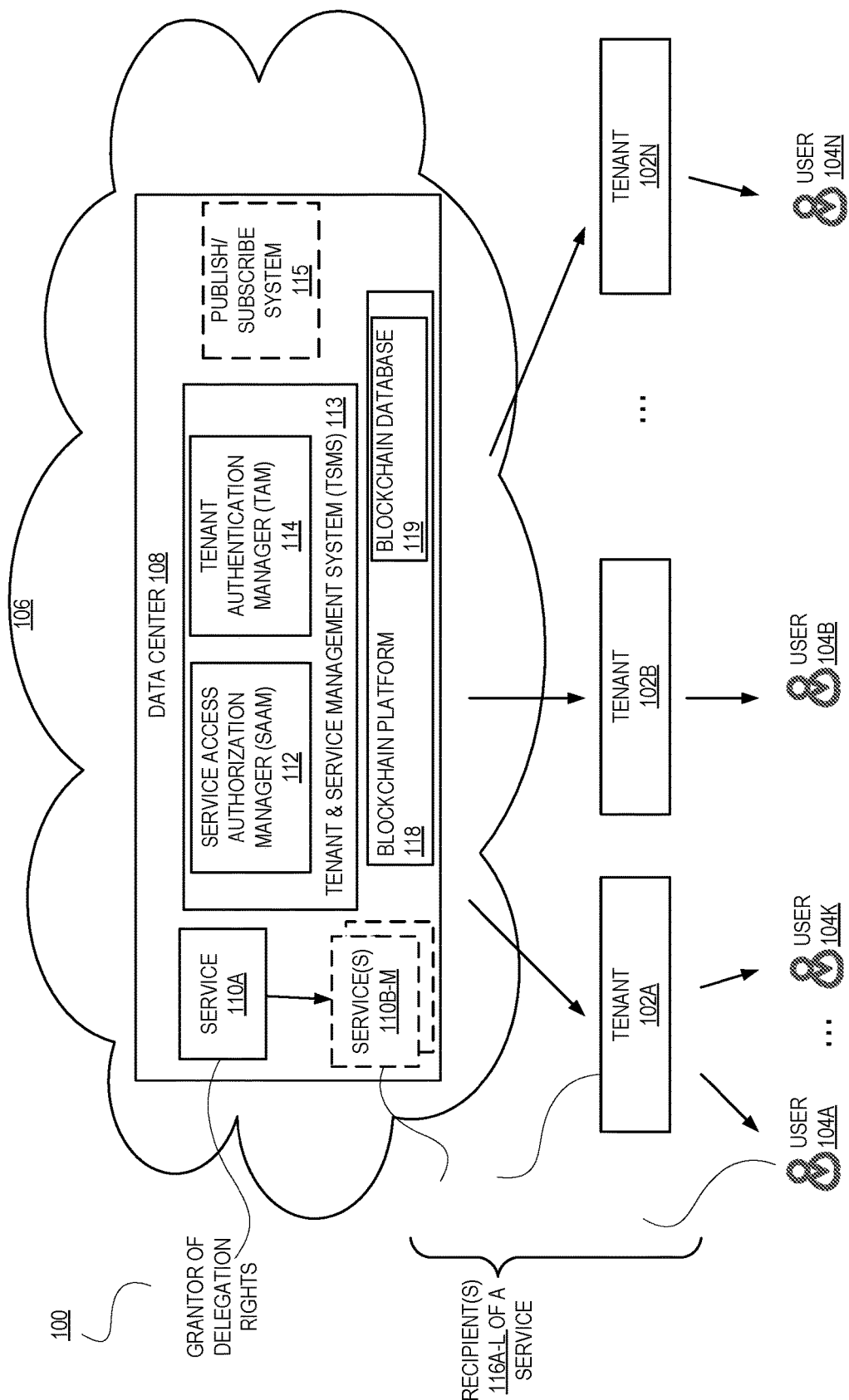
FIG. 1 illustrates a block diagram of an exemplary cloud-based infrastructure in which management of cloud services using smart contracts can be performed, in accordance with some embodiments.

The following description describes methods and apparatus for management of cloud services using smart contracts to facilitate various functions, such as tenant login, tenant enrollment, service registration, tenant usage charging, tenant usage tracking, tenant quota management, and tenant rights revocation. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A blockchain system is a platform used for building, running, and deploying a distributed ledger. The distributed ledger permanently records, and in a verifiable way, digital records of transactions that occur between two parties. The distributed ledger is maintained without a central authority or implementation. The distributed ledger is referred to as a blockchain database that includes blocks, which are linked and secured using cryptography.

FIG. 1 illustrates a block diagram of an exemplary cloud-based infrastructure 100 in which management, using smart contracts, of cloud-based services can be performed, in accordance with some embodiments. The exemplary cloud-based architecture may include one or more data centers 108 disposed in a cloud operator network 106 that may be configured to offer a variety of resources and services to multiple tenants (i.e., multi-tenancy) pursuant to suitable service level agreements, service management contracts, and so on.

A tenant, for the purposes of the present disclosure, may be understood as a person, organization, business entity, or a group of users, that desires to enroll with the cloud operator or provider for accessing a specific set of resources/services under particular authentication/authorization credentials, privileges, constraints, and/or policy-based business rules.

By way of illustration, a plurality of tenant entities 102A to 102N exemplified in FIG. 1 may comprise corporate, commercial or governmental organizations, a private person or a group of persons, that may request and consume one or more services 110A-M hosted by the cloud-based data center 108 via one or more electronic devices in tenant premises disposed in tethered (wired) or untethered (wireless) network environments. Each of the tenant 102A-N may have one or more users 104A-104K, 104B, and 104N that can, using an electronic device in a tenant premise, request and access one or more services of the data center 108. The users 104 can be employees of an organization, a private individual, customers of an organization, etc. Each user can have a different level of access rights for accessing one or more of the services 110A-M. In some embodiments, tenants and services are represented in the data center 108 via contract accounts. The accounts are recorded by the tenant and service management system (TSMS) 113 in the blockchain database 119 through the blockchain platform 118. For tenants, each account may specify the identity of the tenant (e.g., with unique identification of the tenant (e.g., the tenant's public key and contact information such as an email address, a phone number or the like)) and charging credentials for settlement upon usage of one or more services.

As such, example tenant entities 102A-102N may span across various types of businesses and industries, and may consume one or more resources/services 110A-M including, without limitation, cloud storage resources, processor compute resources, network bandwidth resources, load balancing services, virtualized network infrastructure resources, Software as a Service (SaaS) services, Platform as a Service (PaaS) services, Infrastructure as a Service (IaaS) services, streaming media services, voice telephony/VoIP services, and one or more inline services such as, e.g., Deep Packet Inspection (DPI) services, Virus Scanning (VS) services, Intrusion Detection and Prevention (IDP) services, Firewall (FW) filtering services and Network Address Translation (NAT) services, and the like. Each service is represented in the data center 108 via a contract account. The service account is recorded by the TSMS 113 in the blockchain database 119 through the blockchain platform 118. Each service account specifies the identification of the service. The identification of the service includes a unique identifier that is generated for the service at the time of registration. The service has a unique pair of cryptographic private and public keys defined based on an asymmetric cryptographic scheme. The service account may further specify a name for the service (e.g., a name in a human readable format), charging credentials for settlement upon usage of one or more services by the service, and contact information for one or more persons (e.g., the owner of the service, the administrator of the service, etc.). In some embodiments, the service can be identified with its cryptographic public key in some applications and with another identifier in other applications. For example, the cryptographic public key of the service can be used to identify the service within the blockchain database 119 (operated through the blockchain platform 118). In another example, a name of the service defined based on a top-level naming scheme that is different from the cryptographic public key of the service can be used to uniquely identify the service for usage tracking and billing. Each one of the services 110A-M includes a service manager SM that is operative to communicate with the TSMS 113 for performing administrative tasks related to the management of the service. For example, the SM (e.g., SM 111A) is operative to register the service, and handle tenant enrollment and tenant login. Broadly, with a multitenant architecture, the data center 108 may be arranged to provide every tenant a dedicated or configurable share of a resource/service including its data, configuration, user management, tenant individual functionality as well as properties such as security, charging, etc.

At a macro level, the data center 108 may be implemented in a hierarchically interconnected system of multiple nodes including appropriate compute, storage and network elements disposed in a wide area backbone (e.g., IP or Next Generation Network (NGN)), to which a tenant premises equipment or subscriber end station may have secure Internet access. In one embodiment, a tenant premise can have its own compute resources logically separated from the cloud-based services 110. In another arrangement, a tenant's private cloud may be accessed remotely via suitable Secure Sockets Layer (SSL) or IPSec virtual private network (VPN) connections. Regardless of a particular multitenant architecture, example data center 108 may be organized based on a multi-layer hierarchical network model which may in general include three layers of hierarchy: a core layer (typically characterized by a high degree of redundancy and bandwidth capacity, optimized for high availability and performance), an aggregation layer that may be characterized by a high degree of high-bandwidth port density capacity (optimized for traffic distribution and link fan-out capabilities to access layer switches, and an access layer serving to connect host/server nodes to the network infrastructure.

From the perspective of a functional model, exemplary data center 108 may be comprised of the following layers: (i) network layer, (ii) services layer, (iii) compute layer, (iv) storage layer, and (v) management layer. Skilled artisans will recognize that with respect to the services layer there can be a difference between a conventional data center services layer and the cloud-based data center services layer in that the functional reference model of the cloud-based data center services layer may be architected for supporting application of L4-L7 services at a per-tenant level, e.g., through logical abstraction of the physical resources including hardware and software resources. Even with L4-L7 integrated services being provided, a cloud-based data center services layer may be configured to implement centralized services which may be more useful in applying policies that are broadly applicable across a range of tenants (or across different workgroups within a tenant premises network). An example management layer of the data center 108 may be architected as a set of logical, functional and structural resources used to support and manage the overall multitenant architecture, including domain element management systems as well as higher level service orchestration systems, preferably configured to executing various data center administration functions regarding storage, compute, and network resources, including elements which allow for more dynamic resource allocation and automated processes (i.e., instantiating administrative or tenant user portals, service catalogs, workflow automation, tenant lifecycle management, scripting smart contracts, and the like). In one embodiment, a tenant and service management system (TSMS) 113 including a service access authorization manager (SAAM) 112 and a tenant authentication manager (TAM) 114 may therefore be implemented as a "superset" or "backend" functionality of the data center 108 in connection with the hosted resources/services 110 configured to serve the plurality of tenants 102A to 102N for purposes of an example embodiment of the present invention as it will be described in further detail below.

The data center 108 includes the TSMS 113 and a blockchain platform 118. The TSMS 113 includes the service access authorization manager 112 and the tenant authentication manager 114. The TSMS 113 (including the service access authorization manager 112 and the tenant authentication manager 114) is operative to expose a communication interface (e.g., using a Representational state transfer (REST) Application Programming interface (API) formulated through Hypertext Transfer Protocol (HTTP) requests) for use by the tenants 102A-N and/or the services 110A-M to enroll/register, request and obtain access to one or more of the services 110A-M, and track usage of these services by the tenants and/or the services. The service access authorization manager 112 provides a mechanism for authorizing tenants and services to have access to particular service offer(s) of a service for a determined period of time. The tenant authentication manager 114 is operative to identify tenants and authenticate that a particular communicating entity corresponds to a tenant that previously established its identity with the system. The blockchain platform 118 includes a blockchain database 119 for storing and recording smart delegation contracts between the service(s) and the TSMS 113 and sub-delegation smart contract between the service(s) and requestors. While the blockchain platform 118 is illustrated as being part of the data center 108, in some embodiments, the blockchain platform 118 can be located in one or more other data centers that are communicatively coupled with the data center 108. The blockchain database 119 is a permissioned, distributed ledger that is implemented on multiple network devices.

In some embodiments, the data center 108 can include a publish/subscribe system 115 that enables the different components of the data center 108 to communicate via a publish/subscribe scheme. The publish/subscribe system 115, which is referred to herein below as the Pub/Sub system 115, allows a publisher (e.g., a service 110A, the TSMS 113) to create a topic and to send messages to the topic. Other components of the data center 108 (e.g., other services 110B-M, the TSMS 113, the tenants 102A-N) can subscribe to the topic to obtain updates/messages published to this topic by the publisher. In some embodiments, the messages are persisted in a message store until they are delivered and acknowledged by subscribers. The Pub/Sub system 115 forwards messages from a topic to all of its subscriptions, individually. Each subscription receives messages either by Pub/Sub pushing them to the subscriber's chosen endpoint, or by the subscriber pulling them from the service. The subscriber receives pending messages from its subscription and acknowledges each one to the Pub/Sub system 115.

The data center 108 is operative to enable service access authorization to tenants and/or services based on smart contracts recorded on a permissioned, distributed ledger (e.g., a blockchain) through the blockchain platform 118. The service access authorization manager 112 is operative to generate custom smart delegation contracts for particular classes of users and types of payment credentials and to delegate authorization for the use of service attributes to tenants, sub-tenants and other services.

In some implementations, the TSMS 113 (including the service access authorization manager 112 and the tenant authentication manager 114) may be built on an open source distributed ledger and smart contract platform (e.g., Quorum™). The service TSMS 113 functions as a DApp—that is, a blockchain-based, distributed application—on top of an open source distributed ledger. It accesses the blockchain database 119 and interacts with smart delegation contract objects stored in the blockchain database. In some embodiments, the TSMS 113 runs on a server in the data center 108. For example, each server in a particular server cluster of the data center 108 (rack, rack row, etc.) may have an instance of the TSMS 113 as well as an instance of the blockchain platform 118 running on it, thus forming the blockchain and the tenant/service management platform. In some embodiments, data center instance management mechanisms may be used to confine the TSMS 113 instances to specific servers, consequently reducing the overhead.

In the following description operations will be described between the TSMS 113, the service 110A, and a requestor 120 (which can be one of the tenant entities 102A-N or a service from the services 110B-M) by way of example and in the interest of simplifying the description below. One of ordinary skill in the art would recognize that these operations can be performed between other entities in the data center 108 without departing from the scope of the present invention.

Service Registration and Global Quota Update

In some embodiments, a method and a server including a tenant and service management system (TSMS) in a data center for managing access to one or more services by a plurality of users are described. The TSMS receives an identification that uniquely identifies the service and a description of a set of one or more resources offered by the service, The TSMS records into a blockchain database a smart delegation contract between the service and the tenant and service management system. The smart delegation contract includes the identification of the service, an identification of the tenant and service management system, and the description of the set of resources. The smart delegation contract is cryptographically signed with a cryptographic private key of the service that is part of a cryptographic public-private key pair for the service and with a cryptographic private key of the tenant and service management system that is part of a cryptographic public-private key pair for the tenant and service management system. Following the registration of the service (including the recordation of the smart delegation contract between the service and the TSMS), the TSMS receives from a requestor a request to access the service; and authorizes the requestor to access the service based at least in part on the smart delegation contract between the service and the tenant and service management system.

Figure 2A:
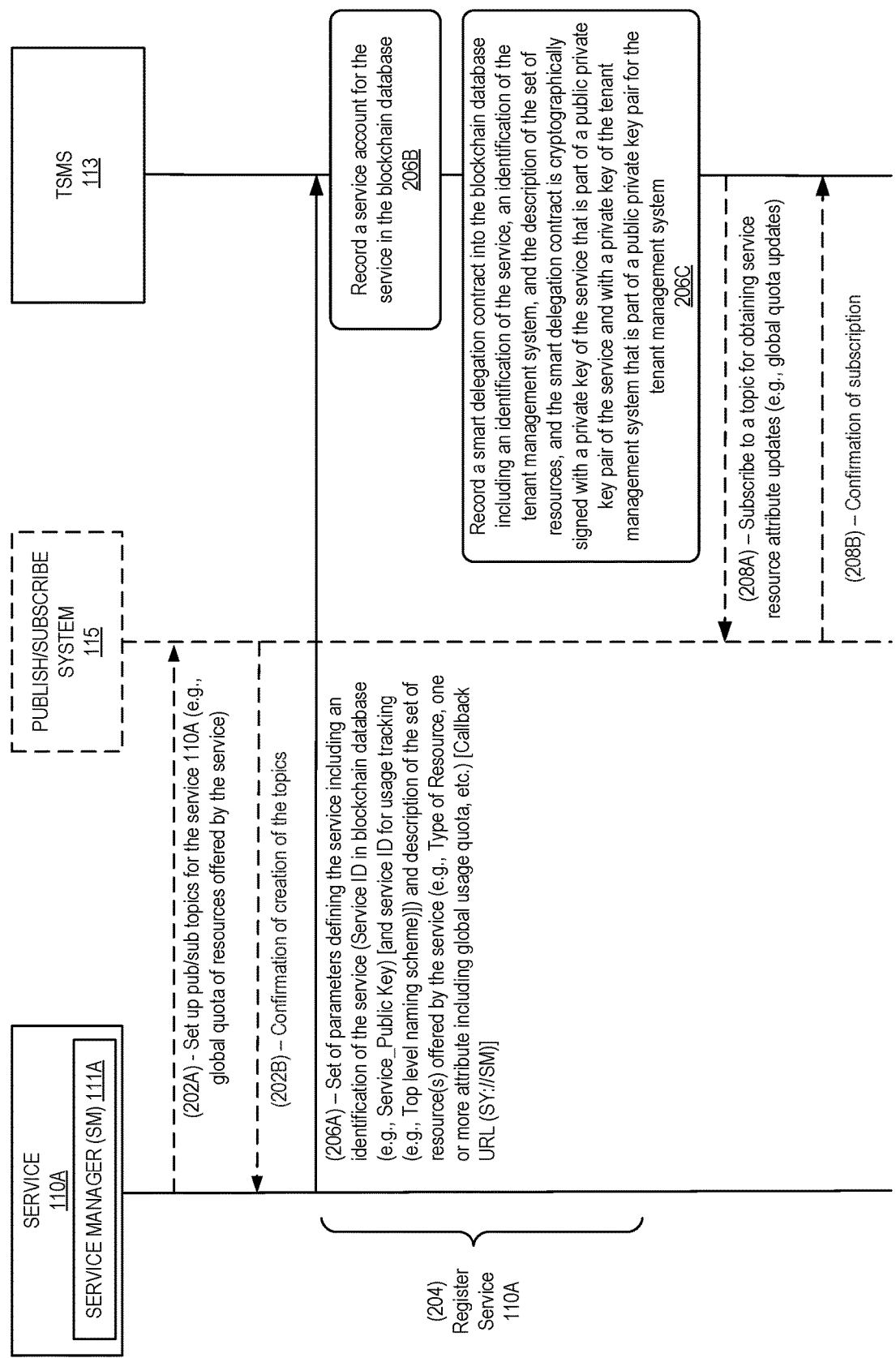
FIG. 2A illustrates a block diagram of exemplary operations for a service registration process in accordance with some embodiments.

FIG. 2A illustrates a block diagram of exemplary operations for a service registration process in accordance with some embodiments. The TSMS 113 is operative to enable registration of one or more services 110A-M to offer a service to the tenants 102A-N and/or other services 110B-M. At operation 204, the TSMS 113 registers the service 110A with the TSMS 113. In the following description, the tenant authentication manager 114 within the TSMS 113 performs the operations of TSMS 113 in FIGS. 2A-B. At operation 206A, the TSMS 113 receives from the service 110A a set of parameters defining the service 110A. The set of parameters transmitted by the service 110A includes an identification that uniquely identifies the service. The identification may include one or more identifiers for the service. In one embodiment, the identification includes a first identifier that is the cryptographic key of the service. The cryptographic key of the service is used to uniquely identify the service 110A in the blockchain database 119. In some embodiments, the cryptographic key can also be used to identify the service 110A for usage tracking and billing purposes. In other embodiments, in addition to the cryptographic key of the service 110A, the identification can further include a second identifier of the service (e.g., a name of the service in a top-level naming scheme) that is different than the cryptographic key of the service. The second identifier can be used for uniquely identifying the service when tracking usage of the service and billing the user for the usage. The second identifier can be in a human-readable format describing the service as opposed to the first identifier that is a public cryptographic key from the set of public/private keys generated for the service. In some embodiments, the second identifier can be in any other type of formats that is not a human-readable and is different from the first identifier used for identifying the service in the blockchain database. The parameters further include a description of one or more resources offered by the service. The description of the resource(s) includes a set of attributes defining the type of the resource(s) offered. In some embodiments, the attributes include global quotas defining the maximum amount of a resource that all users can use during an interval of time. In some embodiments, the parameters further include a callback URL for the service 110A.

At operation 206A, the TSMS 113 records a service account for the service in the blockchain database. In some embodiments, this operation can be performed at another time (prior to receiving the set of parameters) and separately from the operations 206C. In other embodiments, the operation 206B and 206C are performed following the receipt of the parameters at operation 206A. At operation 206C, the TSMS 113 records a smart delegation contract for the global quotas of the resources offered by the service. The smart delegation contract is established between the service 110A and the TSMS 113. The smart delegation contract is stored in the blockchain database 119 through the blockchain platform 118 and enables the TSMS 113 to sub-delegates usage rights of the service to one or more requestors (e.g., tenants 102A-N and/or services 110B-M). In other words, the smart delegation contract enables the TSMS 113 to provide and authorize access to the service 110A through sub-delegation of rights to one or more requestor based on the smart delegation contract established between the service 110A and the TSMS 113.

The smart delegation contract includes an identification of the service, an identification of the tenant and service management system, and the description of the set of resources, and the smart delegation contract is cryptographically signed with a private key of the service and with a private key of the tenant and service management system. The identification of the service includes a first identifier that identifies the service within the blockchain database. For example, the first identifier can be the public key from the unique pair of cryptographic private and public keys associated with the service. The identification of the tenant and service management system uniquely identifies the TSMS 113 within the blockchain database 119. In some embodiments, the identification of the service includes a second identifier that is in a human readable format. The second identifier of the service can be used to track usage of the service and charge the users for their usage of the service. The identification of the TSMS 113 is the public key of the tenant and service management system from the unique pair of cryptographic private and public keys associated with the service.

In some embodiments, in addition to registering the service with the TSMS 113, the service 110A sets up, at operation 202A, one or more topics in the Pub/Sub system 115. The topics can be used to track and update the global quota of each resource offered by the service 110A. For example, when the service 110A offers two resources (e.g., CPU and storage) the service 110A sets up a topic for each one of the resources with the publish/subscribe system 115. In some embodiments, the creation of the topics (operation 202A) can be performed prior to the registration of the service, i.e., prior to operations 204. In these embodiments, the parameters received by the TSMS 113 at operation 206A also include one or more Pub/Sub topics. The Pub/Sub topics enable the tracking of the global quota of each resource offered of the service 110A. The service's global quota(s) are tracked based on the message bus that links the TSMS 113 with the Service Manager 111A in the Pub/Sub system 115.

In some embodiments, the operation 206A is performed at the time of enrollment of the service through a REST API offered by the TSMS 113. The service 110A provides the following information as a JavaScript Object Notation (JSON) document:
- The public key establishing the service's identity on the blockchain
- Name of the service
- Set of offered resources
- Pub/Sub topic under which the service's usage can be tracked through the message bus that links the Tenant and Service Management System with the Service Manager.

The service registration process also includes how much global quota of resources the service wants to delegate to the TSMS 113 for subdelegation to tenants. During the registration, the service is first registered on the blockchain as a service entity (operation 206B), and then the TSMS 113 registers (operation 206C) a "delegation" object on the blockchain for the grant from the service entity on the blockchain to the TSMS 113, the top level contract object on the blockchain that manages tenants and services. The TSMS 113 sub-delegates the quota of resources to tenants and other services when they request grants of such resources offered by the service. Such smart delegation contracts serve as the root of the subsequent chain of sub-delegations of the service's resources from TSMS 113 to interested tenants and services.

Figure 2B:
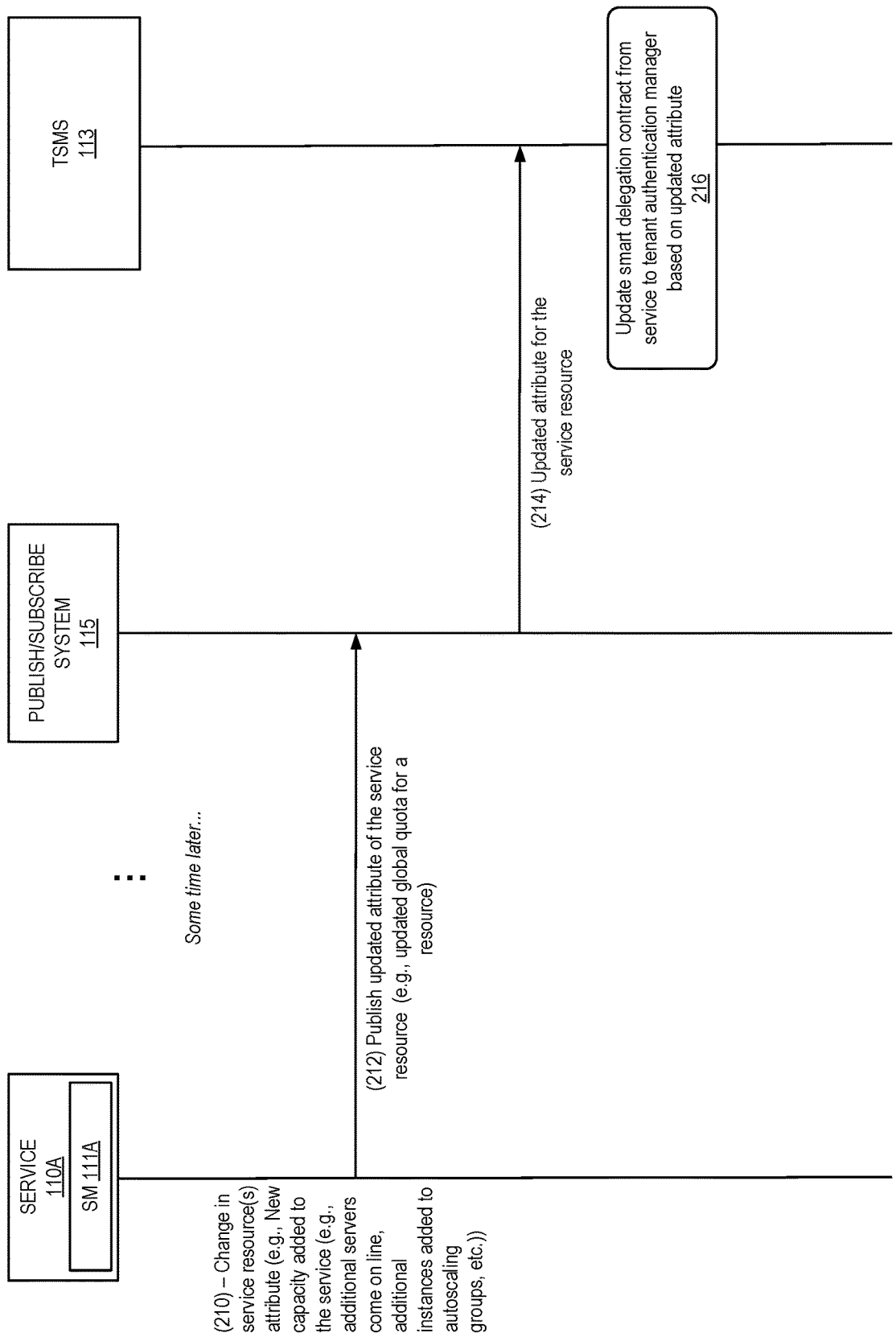
FIG. 2B illustrates a block diagram of exemplary operations for a service registration process in accordance with some embodiments.

FIG. 2B illustrates a block diagram of exemplary operations for a service registration process in accordance with some embodiments. In some embodiments, the service may periodically publish (operation 212) a change of an attribute of a service resource (e.g., the global quota for a resource type), for the TSMS 113 to use the updated quota. The published updated parameters (e.g., updated global quota) is received by the Pub/Sub system 115. TSMS 113 in turn listens for such published messages and accordingly updates, at operation 216, the smart delegation contract on the blockchain database 119. The updates can be performed when a change in the resources offered by the service occurs. For example, when additional capacity is added to the service. For example, if a collection of new servers comes on line, the Service Manager 111A of the service 110A will push new total/global quotas to TSMS 113 through the Pub/Sub system 115. The use of the Pub/Sub mechanism allows for an efficient management of updates and changes that occur in the services offered by the service 110A.

In some embodiments, if the new global quota is determined to be lower than already-delegated rights for a service resource, the service may choose which delegations to tenants and services it wants to revoke before being allowed to lower the delegated global quota. For instance, if multiple servers go offline, the Service Manager 111A may reduce the global quota as a result, and if the currently delegated compute rights sum up to more than the available capacity, then first Service Manager 111A revoke some of those delegations before the global quota can be reduced.

The pseudo-code described below illustrates an exemplary implementation that can be used for defining the smart delegation contract between the service and the TSMS 113. The JSON object includes a first identifier of the service ("public_key"), the second identifier of the service ("name"), the set of resources offered by the service ("resources_jwt") and the pub/sub topics transmitted by the service and the callback_url ("service_jwt"). Method: POST

```
Endpoint: /services (exposed by TSMS)
Payload sent by service:
JSON object in the following format
{
    "public_key": "0x....",
    "name": "SvcMgrCompute",
    "resources_jwt": [<Array of JWTs>],
    "service_jwt": "<JWT with pubsub_topic and callback_url>"
}
JSON Payload of the "service_jwt":
{
    "pubsub_topic": "SvcMgrCompute/usage",
    "callback_url": http://NefeleLoadBalancedIP/callback
}
Example JSON payload for Service Manager service's resource types:
Here we show the JSON payload for one resource JWT provided in
the array
"resource_jwt".
{
        "name": "process_type_1",
        "simple_attributes": [
            { "name": "memory_in_gb", "value": "2" },
                { "name": "tmp_storage_in_gb", "value": "1" }
        ],
        "metrics": [
            { "name": "compute_usage", "unit":
            "cpu_second", "rate": 0.00002,
        "usage_publishing_interval": 300 },
                { "name": "num_of_invocations", "unit":
                "invocation", "rate": 0.00001,
            "usage_publishing_interval": 300 }
        ],
        "charging": { "currency": "USD", "charging_interval": 1800 },
            "quota": 1000000000
}
Service Resource Types
```

Several types of service resources can be offered by the services 110A-M. For example, virtual machine, object store, block store, function as a service (FaaS), can be types of services offered. Each resource type can be described by one or more of the following parameters:

Field "name", Type String: Name of the resource type

Field "simple_attributes", Type is Array of objects, optionally empty: These are the static single-valued attributes and their values that define the resource type, and are in a format that is understandable to the service as well as the interested tenant/service that would be the recipient of the service. Such attributes could represent limits (e.g., max_memory for a virtual machine (VM) or process is 2 GB)

In some embodiments, each attribute object can have the following fields:

Field "name", Type String: Name of the attribute

Field "value", Type String: Value of the attribute

Such attributes are static—that is, the value of such attributes has been defined by the service for the specific resource type. This represents the service crafting different resource types based on different bundles of service attributes. These attributes allow the service to offer multiple service offers to the requestor. Further, the static attributes are not distributable—that is, no grantor can distribute a subset of such an attribute to sub-delegations. As an example, if an attribute is maximum memory for a VM or process resource type, and a grantor has 2 GB value for that attribute, it cannot sub-delegate 1 GB as part of a grant.

Field "set_attributes", Type is Array of objects, optionally empty: This is another array of attributes, similar to the above, but with the distinction that these attributes can have sets as values. If a requestor (tenant or service) has a rights grant (a smart delegation contract from a service) with a set S of values for such a set-based attribute of a resource type, then the requestor can create sub-delegations having that set-based attribute with a subset of S as the value. So, validation of such attributes in delegations is based on set-containment. Typical uses of such attributes are to represent aspects like access control permissions (e.g., read, write, execute, etc.).

In some embodiments, each one of the set attributes may have the following fields:

Field "name", Type String: Name of the attribute

Field "value", Type is Array of strings: Set of values of the attribute

Field "dynamic", Type Boolean: Dynamic (changeable) or not

Field "metrics", Type is Array of objects:

A resource type can offer one or more ways of modeling the metering of its usage. A metric can be defined for a resource type and can be modeled as an object having the following fields:

Field "name", Type String: Name of the metric.

Field "unit", Type String: Unit of metering.

Field "rate", Type Numeric (Integer, Float etc.—JSON Number Type): Pricing of each unit of the metric, zero for free resource.

Field "usage_publishing_interval", Type Integer: Every such interval of time, usage values for this metric are published by the service or its associated metrics system.

Field "charging", Type is Object with these fields for charging details:

Field "currency", Type String: One of few supported string values representing the currency in which charging occurs.

Field "charging_interval", Type Integer: Every such interval of time (in seconds), charging action happens for each tenant/service that has consumed any metered usage of the resource type. The charging for the usage of the service resource is calculated based on all metrics recorded for that resource type.

Field "quota", Type Integer: This represents a type of overall amount of usage of the resource type that has been granted by the service to the grantee in a delegation. When a service grants such a quota of a resource type to the TSMS 113, it represents the overall or global quota (i.e., distributable capacity) of how many/much of such resource type the service can support and hence offer. In case of the TSMS 113 delegating further to interested tenants/services (i.e., to the requestor), or in case of other sub-delegations, such a quota represents how many/much is granted to the grantee for use.

If a service does not wish to impose a distributable capacity or global quota (e.g., a Compute Service, or Function as a Service), then it can leave this field empty, in which case no associated delegations/sub-delegations have any quota per se—the only limits applicable then are the ones set in attributes field of that resource type in the grant details, and usage is charged on-demand.

Below are some examples of how resources offered by services 110A-M in the data center 108 can be modeled.

A first example can be a service offering virtual machine (VM) services:

```
Resource type 1:
name = m4
simple_attributes = [
    { name = memory, value = M1 },
    { name = storage, value = EBS },
    { name = storage_size, value = S1 },
    ... ]
metrics = [ { name = up_time, unit = hour (CPU),
    rate = R1, ... }, ... ]
charging = { currency = USD, charging_interval = 3600 }
quota = 1000 <essentially represents that the system can support
1000 m4 VM's
concurrently>
Resource type 2:
name = t2.micro
simple_attributes = [
    { name = memory, value = M2 },
    { name = storage, value = EBS },
    { name = storage_size, value = S2 },
    ... ]
metrics = [ { name = up_time, unit = hour (CPU),
    rate = R2, ... }, ... ]
charging = { currency = USD, charging_interval = 3600 }
quota = 500
```

A second example can be a service offering cloud storage services (i.e., Object Storage services):

```
Resource type 1:
name = simple_store
metrics = [
    { name = read_requests, unit = 1000 requests, rate = R1, ... },
    { name = write_requests, unit = 1000 requests, rate = R2, ... },
    { name = in_bandwidth, unit = GB, rate = R3, ... },
    ... ]
charging = { currency = USD, charging_interval = 3600 }
//Note that no quota is specified for this resource type by the service.
```

A third example can be a service offering Block Storage services:

```
Resource type 1:
name = gp_ssd
simple_attributes = [
    { name = throughput_rate, value = X },
    ... ]
metrics = [ { name = storage_used, unit = GB_month,
    rate = R1, ... }, ... ]
charging = { currency = USD, charging_interval = 3600 }
Resource type 2:
name = io_ssd
simple_attributes = [ { name = iops, value = X },
metrics = [
    { name = storage_used, unit = GB_month, rate = R2, ... },
    { name = iops, unit = IOPS_month, rate = R3, ... }
```

-continued

```
    ... ]
charging = { currency = USD, charging_interval = 3600 }
```

Another example can be a service offering FaaS (Lambda):

```
Resource type 1:
name = lambda_func_type1
simple_attributes = [
    { name = memory, value = X },
    { name = tmp_storage, value = Y },
    ... ]
metrics = [
    { name = compute_usage, unit = GB_second (CPU),
        rate = R1, ... },
    { name = num_of_invocations, unit = one invocation,
        rate = R2, ... },
    ... ]
charging = { currency = USD, charging_interval = 3600 }
quota = Q1 <number of concurrent processes that the service can handle>
```

Note that here the FaaS service chose to consider total number of concurrent processes that it can handle as total distributable capacity/quota, but that has implications on the fact that if the service avoids over-provisioning by such total capacity promise, then it loses out if pricing is on-demand. Alternatively, the service could over-provision to meet peak demands, do on-demand pricing, and have no distributable quota, rather limit a run-away user by having a limit-type attribute max_concurrent_processes=1000 in the simple_attributes field. It is up to the service to select the different attributes and provide multiple service offers to users.

In some embodiments, Resource type 2 could be another type of Lambda function, with a different memory/storage attribute, or execution measured in CPU seconds only rather than GB second.

One of ordinary skill in the art would recognize that the multiple service resources and attributes described above are exemplary only and the embodiments described herein are not limited by such examples. Other types of service resources and attributes can be offered by the different services without departing from the scope of the present invention.

Tenant Enrollment and Login

Figure 3A:
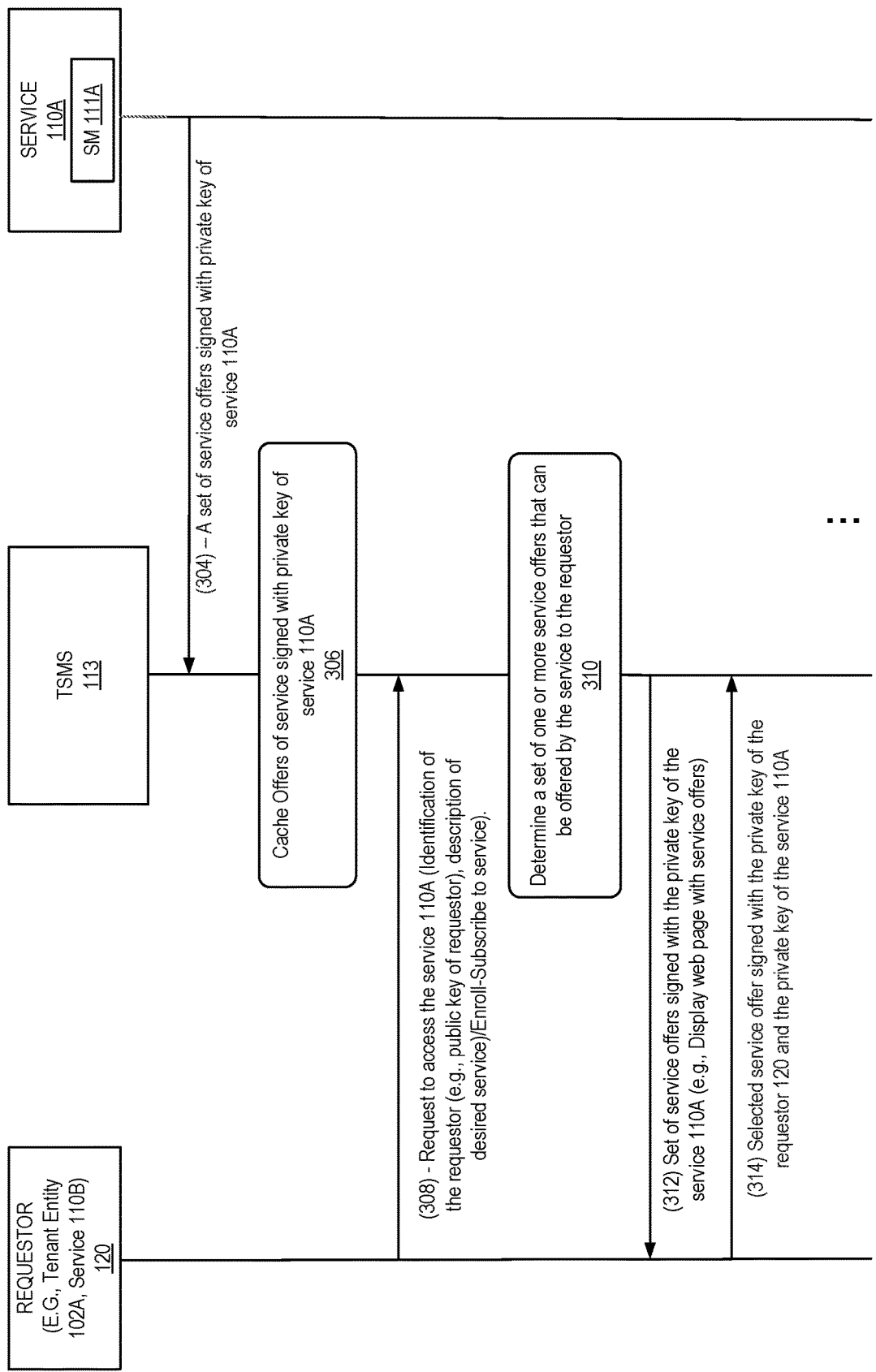
FIG. 3A illustrates a block diagram of exemplary operations for tenant enrollment in accordance with some embodiments. The tenant enrolls into the system via its public key.

FIG. 3A illustrates a block diagram of exemplary operations for tenant enrollment in accordance with some embodiments. The tenant enrolls into the system via its public key. After enrollment, the tenant logs into the system and selects the set of services that it needs, as illustrated in FIG. 3A-B.

Figure 3B:
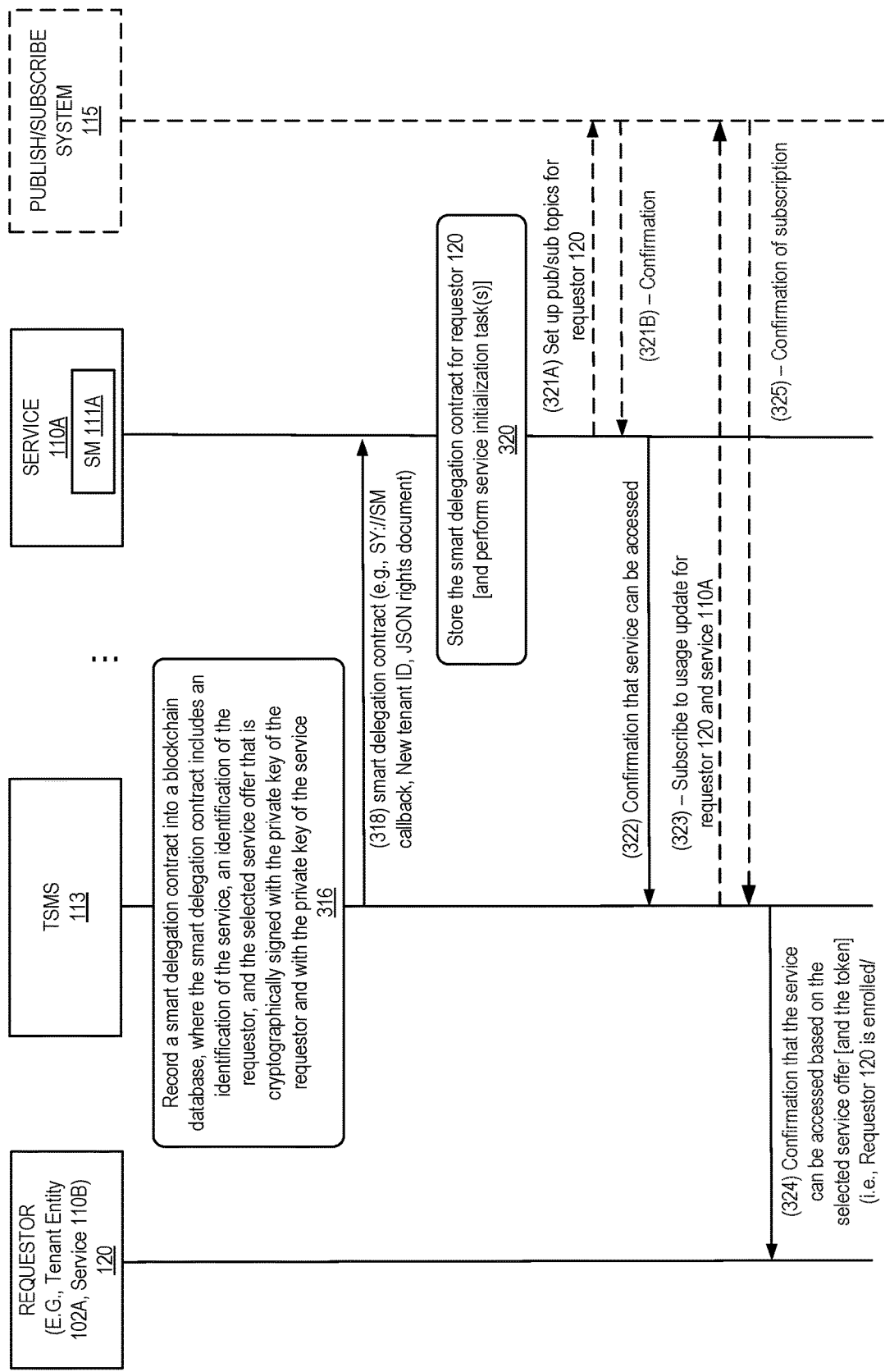
FIG. 3B illustrates a block diagram of operations performed to further enable service access authorization in accordance with some embodiments.

FIGS. 3A-B illustrate block diagrams of exemplary operations for authorizing access to a service in accordance with some embodiments. In some embodiments, the operations of FIGS. 3A-3B are performed when the requestor attempts to create an account with the data center 108 or alternatively when attempting to subscribe to the service 110A. In the following description, the service access authorization manager 112 within the TSMS 113 performs the operations of the TSMS 113. The service access authorization manager 112 represents a tenant's or service's rights delegation as a smart contract of type delegation (which is referred to herein as a smart delegation contract). In some embodiments, communications between the requestor 120, the service access authorization manager 112 and the service 110A can be a REST API messages formulated as HTTP messages.

At operation 304, a set of service offers are received from the service 110A. Each service offer is signed with a private key of the service 110A. A service offer may include a description of service attributes defining the service that is to be offered. For example, a service offer may include quotas specifying the maximum amount of the service attributes that can be consumed by the requestor. In some embodiments, the service offer may also include charging schedules for the service attributes indicating how the requestor is to be charged for using the service as indicated in the service offer. Each service offer may be formatted in a language-independent file format such as a JSON document. Other formats can be used to define the service offer without departing from the scope of the present invention. In some embodiments, the service offers sent to the service access authorization manager 112 can depend from the type of tenant to which they can be offered.

The service offer may include the type of service that is to be offered, and the charging schedule for this service offer. For example, a service offer can specify a grant of rights from the ComputeService for up to 5 virtual machines (VMs) with a maximum per VM memory of 4 GB and a maximum per VM CPU time of 3600 hours. The charging of VM CPU time in hours is done every 12 hours at the rate of 0.05 US Dollars per hour. The service offer described herein is intended to be exemplary only and should not be regarded as a limiting example of the embodiments of the present invention. Several types of offers can be defined and transmitted to the service access authorization manager 112 without departing from the scope of the present invention.

Referring back to FIG. 3A, in some embodiments, the service access authorization manager 112 may cache (operation 306) the offers of service received from the service 110A as signed with the private key of the service 110A. In other embodiments, the set of service offers are used upon being received without the need for caching them. While in the illustrated example, the receipt of these service offers (304) is performed prior to the receipt of a request from the requestor 120, in other embodiments, this operation is performed after the request to access the service 110A is received from the requestor 120.

At operation 308, the service access authorization manager 112 receives, from a requestor, a request to access a service hosted in the data center 108. The requestor is associated with a unique pair of cryptographic private and public keys. The requestor can be a tenant or a service from the services 110.

At operation 310, the service access authorization manager 112 determines a set of one or more service offers that can be offered by the service to the requestor. In one embodiments, determining the set of service offers includes retrieving from a cache the set of one or more service offers. The set of service offers were obtained from the service and are signed with a private key of the service (e.g., through operations 304-306).

At operation 312, the service access authorization manager 112 transmits the set of service offers signed by the service to the requestor 120. In some embodiments, the service access authorization manager 112 may display (operation 312) a graphical user interface (e.g., a web page on a web browser) including the service offers. The requestor 120 selects one of these offers (e.g., a user may select through the web page displayed on an electronic device in the tenant premises, a desired service from a list of services that are offered). The service access authorization manager 112 receives, at operation 314, from the requestor a selected service offer from the set of service offers. The selected service offer is cryptographically signed with the private key of the requestor and with the private key of the service 110A. The signature is stored by the requestor and is used for accessing the service 110A. In some embodiments, the signature resulting from the service offer being signed by the keys of the service and the requestor may be put into a JSON Web Token (JWT), which is a base 64 encoded copy of the JSON document containing the service offer. The JWT including the signature is stored by the requestor and is used for accessing the service 110A.

FIG. 3B illustrates a block diagram of operations performed to further enable service access authorization in accordance with some embodiments. Once the TSMS 113 receives the selected service offer from the requestor 120, it records a smart delegation contract into the blockchain database, at operation 316. The smart delegation contract includes an identification of the service, an identification of the requestor, and the selected service offer that is cryptographically signed with the private key of the requestor and with the private key of the service. The smart delegation contract results from the sub-delegation of the initial contract established between the service 110A and the TSMS 113. The TSMS 113 sub-delegates the rights to access the service 110A to the requestor 120 based on this initial contract. At operation 318, the TSMS 113 transmits the smart delegation contract between the requestor 120 and the service 110A to the service 110A. The service 110A stores a copy of the delegation control. In some embodiments, the service 110A performs initialization tasks related to the service selected by the requestor 120. In other embodiments, the initialization is performed at a later stage when the requestor 120 accesses the service 110A (e.g., at operation 330 of FIG. 3C). In some embodiments, the service 110A transmits a confirmation that the service can be accessed by the requestor at operation 322. In some embodiments, the confirmation is transmitted after the operations 321A and 321B are performed, while in other embodiments, these operations are skipped. At operation 321A the service 110A sets up Pub/Sub topics for the requestor 120. These topics allow a requestor 120 to obtain from the Pub/Sub system 115 messages related to the service 110 when the service publishes any updates. At operation 321B, upon the set-up of the topics, the Pub/Sub system 115 transmits a confirmation of subscription. At operation 324 the TSMS 113 transmits to the requestor 120 a confirmation that the service can be accessed based on the selected service offer and the token (JWT). This is a confirmation that the requestor is enrolled with the service 110A and can now request access to the service. In some embodiments, the TSMS 113 can also perform operations 323 and 325. At operation 323, the TSMS 113 subscribes to usage updates for the requestor 120 and the service 110A to receive any updates on the service offered by the service to the requestor. The Pub/Sub system 115 transmits a confirmation of subscription at operation 325.

Figure 3C:
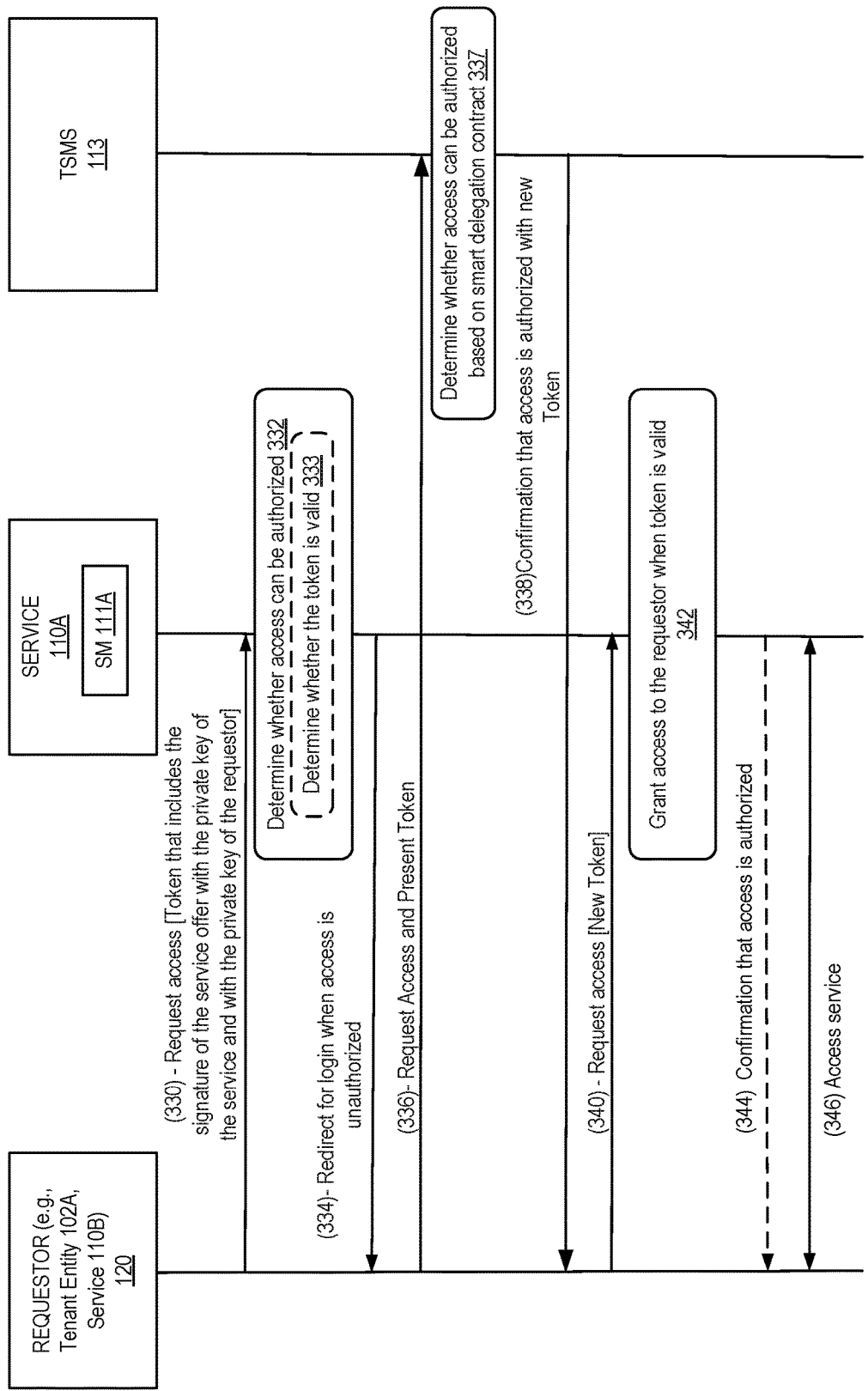
FIG. 3C illustrates exemplary operations for accessing the service based on a smart delegation contract between a requestor and a service in accordance with some embodiments.

FIG. 3C illustrates exemplary operations for accessing the service based on a smart delegation contract between a requestor and a service in accordance with some embodiments. Following the receipt of a confirmation that the service can be accessed, the requestor transmits, at operation 330, a request to access the service. The request includes an identification of the requestor (e.g., the public key of the requestor) and a token determined at least in part based on a service offer signed with the private key of the service and with the private key of the requestor. The service offer was agreed upon by the requestor and the service through the mechanism as described with respect to FIGS. 3A-B. For example, the token is a JWT including a signature of the service offer, where the service offer has been signed with both a private key of the requestor and a private key of the service.

At operation 332, the service 110A determines whether the requestor is authorized to access the service 110A. For example, the determination can be performed based on the token received in the request (operation 333). Upon determining that access to the service is not authorized, the service 110A redirects the requestor, at operation 334, to login again to obtain access to the service. In this scenario, the requestor 120 may redirect the request to the TSMS 113 and obtain a new token for accessing the service 110A if authorized (operations 336-342). At operation 336, the requestor 120 transmits a request to access the service with the original token. At operation 337, the TSMS 113 determines whether access can be authorized based on the smart delegation contract. For example, the TSMS 113 may determine whether the smart delegation contract is still valid (i.e., it has not expired, it has not been invalidated, it has not been revoked, etc.). When the smart delegation contract is determined to be still valid, the TSMS 113 grants access to the requestor based on the service offer defined in the smart delegation contract, by transmitting a confirmation including a new token at operation 338. At operation 340, the requestor 120 transmits a request to access the service 110A with a new token. Upon determining that the new token is valid, the service 110A grants access at operation 342. At operation 344, the service 110A may transmit to the requestor 120 a confirmation that access is authorized. In some embodiments, access is provided to the service without the need of transmitting the confirmation. In some embodiments, at operation 332 the service 110A determines that the requestor 120 is authorized to access the service 110A (e.g., the token is valid) and operations 336-442 are skipped and the flow moves to operation 342, at which the service 110A grants access to the requestor 120. At operation 346, the requestor starts using the service.

The use of service access authentication techniques based on smart contract infrastructures that enable the creation and recordation of a smart delegation contract between a requestor of a service and the service that is provided allows for increased scalability and resilience, and enable the participation of multiple parties (e.g., the cloud infrastructure, the service providers built on top of the cloud infrastructure, tenants (e.g., organizations) and sub-tenants (e.g., employees, customers) in complex business ecosystems. Further authentication of the terms of the contract is enabled by having both parties sign the service offer with their private cryptographic key.

The embodiments herein provide a significant advantage over other technique where a centralized database can store access information by relying on the immutable aspect of the blockchain database storing the contracts Immutability of the smart delegation contracts means that in case of a dispute, the blockchain database can be audited by a third party to determine what actually happened and what was agreed upon between the requestor and the service at the time of the service being requested. Regulators, auditors, and mediators can be given permission for read-only access to the blockchain database in order to monitor and audit the activity. Industries which are heavily regulated, like financial services and health care, especially benefit from such an immutable system. In addition, blockchains are particularly well suited to cases where multiple parties form a business ecosystem in which they cooperate in some cases and compete in others. In some embodiments, the service access authentication manager is run by the cloud provider as part of the cloud management system.

Once access to a service is granted to a requestor and the requestor becomes a recipient of the service, the access can be revoked. To cancel access to the service, the smart delegation contract created between the requestor and the service is revoked or suspended. There are two situations in which a smart delegation contract can be suspended or revoked: 1) expiration of the validity time period (i.e., when the expiry time is reached), or 2) through intervention of a revoker as indicated in the delegation chain. The revoker may determine to revoke or suspend the service due to multiple reasons (e.g., lack or resources, failure of a charging transaction, etc.). In some embodiments, the TSMS 113 may suspend the smart delegation contract before revoking it. In these embodiments, the suspension may allow the requestor (e.g., a tenant or service owner) an opportunity to pursue a restoration procedure with the service provider prior to losing rights to the grant entirely. In other example, the service access authorization manager 112 may revoke the smart delegation contract directly without suspending it before.

Tenant rights delegation, suspension, and revocation are described in further details in PCT/IB2018/050713.

Tenant Service Attribute Usage Tracking

Figure 4:
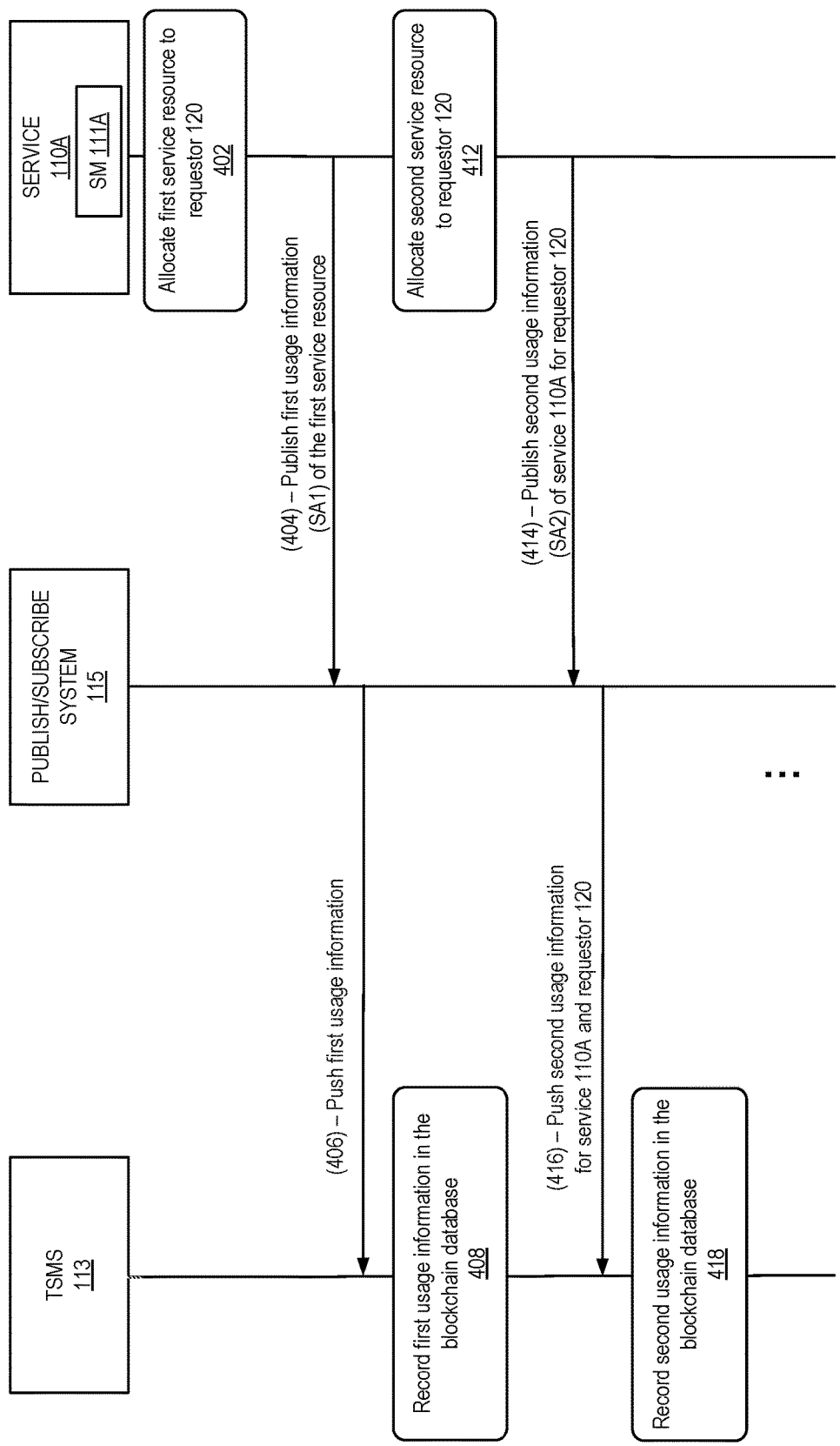
FIG. 4 illustrates a block diagram of exemplary operations for tenant service attribute usage tracking in accordance with some embodiments.

FIG. 4 illustrates a block diagram of exemplary operations for tenant service attribute usage tracking in accordance with some embodiments. Usage of consumable attributes (i.e., resources) by services and tenants is published so that TSMS 113 can enable charging. FIG. 4 illustrates an example where a first service resource followed with a second service resource are allocated to the requestor 120. At operation 402, the service 110A allocates the first service resource to the requestor 120. Upon allocation of the first service resource, the service 110A publishes, at operation 404, the first usage information (SA1) of the first service resource to the Pub/Sub system 115. The first usage information includes information about the type of resource allocated as well as the quota used by the requestor 120. For example, the first usage information can be a number of virtual machines allocated for the requestor 120. The first usage information is associated with an identifier of the service 110A and an identifier of the requestor 120 (e.g., a public key of the service 110A and a public key of the requestor 120, respectively). The first usage information is pushed at operation 406 by the Pub/Sub system 115 to the TSMS 113. The TSMS 113 records the first usage information into the blockchain database in association with the identifiers of the service 110A and the requestor 120.

At operation 412, the service 110A allocates a second service resource to the requestor 120. Upon allocation of the second service resource, the service 110A publishes, at operation 414, the second usage information (SA2) of the second service resource to the Pub/Sub system 115. The second usage information includes information about the type of resource allocated as well as the quota used by the requestor 120. For example, the second usage information can be an amount of storage allocated for the requestor 120. The second usage information is associated with an identifier of the service 110A and an identifier of the requestor 120 (e.g., a public key of the service 110A and a public key of the requestor 120, respectively). The second usage information is pushed at operation 416 by the Pub/Sub system 115 to the TSMS 113. The TSMS 113 records the second usage information into the blockchain database 119 in association with the identifiers of the service 110A and the requestor 120.

The TSMS 113 receives the usage information from the service 110A and records this information into the blockchain database in association with the identifier of the user (e.g., requestor 120) and the identifier of the service. The TSMS 113 further records the type of service that was usage and the amount of service resources used. In some embodiments, the amount of service resources can be a number of physical or virtual resources and/or a resource usage for a determined period of time. In some embodiments, the usage information is stored in a usage object in the blockchain database. The usage object includes the identifiers of the requestor 120 and the service 110A and the attributes of the allocated service resource(s). Thus, the TSMS 113 enables tracking of service usage on the blockchain database 119. As a service determines usage of its resources by a tenant or a service with an authorized smart delegation contract, the TSMS 113 receives this information and populates the usage information in usage objects on the blockchain database.

Tenant Quota Update

Figure 5:
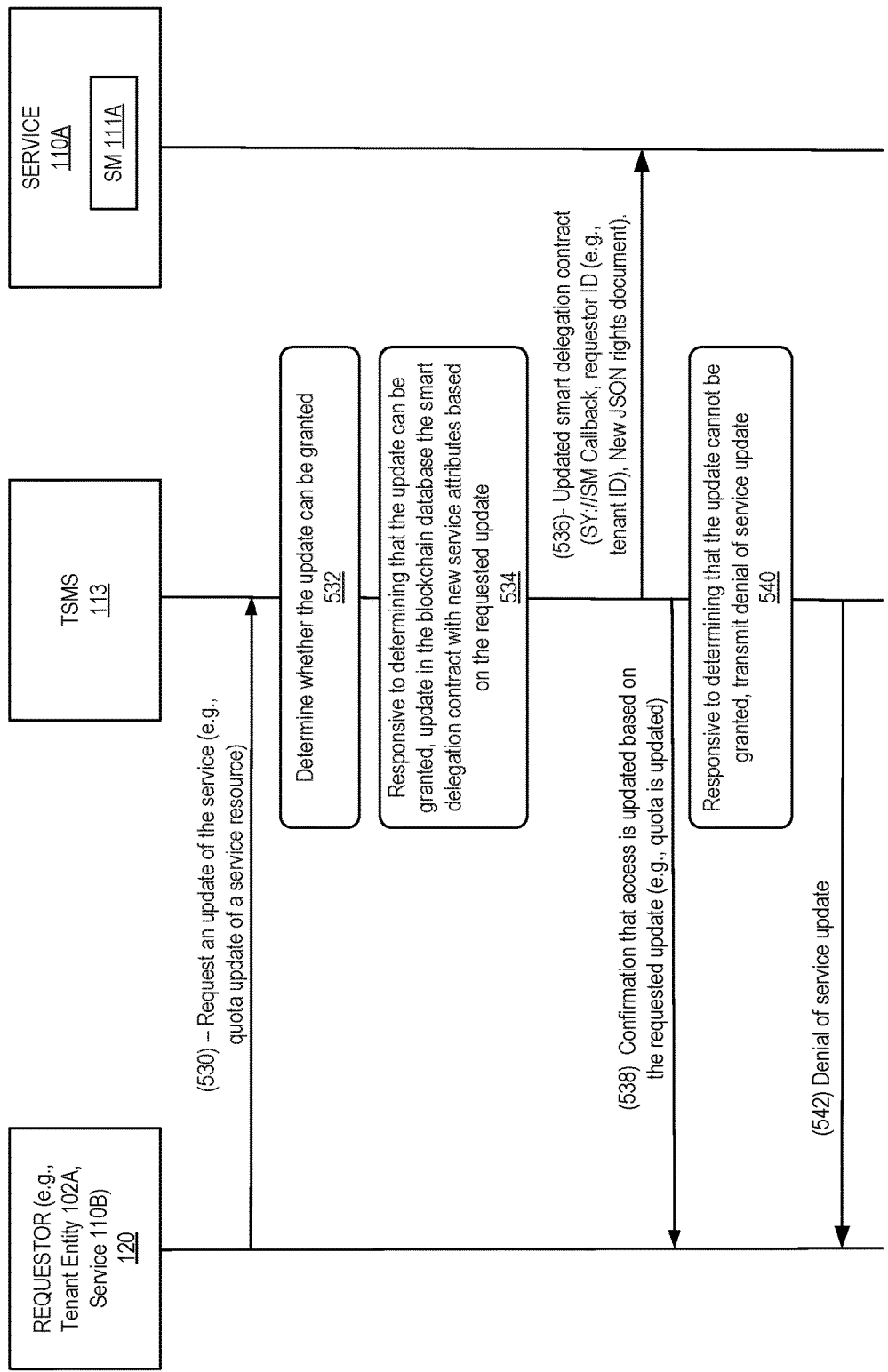
FIG. 5 illustrates a block diagram of exemplary operations for a process for handling a quota update from the tenant in accordance with some embodiments.

FIG. 5 illustrates a block diagram of exemplary operations for a process for handling a quota update from the tenant in accordance with some embodiments. At operation 530, the TSMS 113 receives from the requestor a request for an update of the service 110A. For example, the requestor 120 may request an increase in the quota of a given resource of the service (e.g., additional VMs, additional storage, etc.) or an extension of the time allocated for using the resource(s), etc. The TSMS 113 determines whether the update can be grated. In some embodiments, the TSMS 113 may determine that the update can be granted by transmitting the request to the service 110A and obtaining confirmation or denial from the service 110A of the update. In other embodiments, the TSMS 113 may determine that the update can be granted by looking up information previously obtained from the service 110A with regards to update policies for each requestor. For example, the TSMS 113 may check whether sufficient quota is available to satisfy the request. When the TSMS 113 determines that the update can be granted, it updates in the blockchain database, at operation 534, the smart delegation contract with new service attributes based on the requested update. The TSMS 113 updates the rights delegation of the requestor (e.g., a tenant or a service) and transmits the updated delegation contract to the service 110A at operation 536. The TSMS 113 informs the requestor accordingly, by transmitting at operation 538 a confirmation that access to the service 110A has been updated based on the requested update of service resource. The TSMS 113 causes the service 110A to provision the updated quota to the tenant.

The REST API described below provides a non-limiting example of API that can be used by the service 110A to expose, so that TSMS 113 can transmit to the service 110A updates of service resources granted to a requestor.

---

Example of REST API (endpoint exposed by service):
   Method: POST
   Endpoint: <service-defined>
   Payload provided by TSMS:
   JSON object in the following format
   {
      "callback": "new_rights", <meaning is either new recipient or updated quota>
      "recipient": "0x....", <public key of delegation recipient>
      "delegation_id": "0x...", <delegation contract address>
      "rights": <JSON payload of resources and their details, with quotas reflecting the
actual values delegated to the recipient >}

---

Usage Charging

In one embodiment, the TSMS 113 takes care of contacting outside settlement processors based on the credentials provided by the tenant when they established the account. In the event of an error, the TSMS 113 may contact the service and allow the service to take some action, for example suspending execution of processes and prohibiting further processes from starting or cutting off access to disk volumes. The TSMS 113 will then revoke the tenant's rights delegation until the tenant has an opportunity to pursue a mediation process with the service provider, at which time the rights delegation will be restored. In an alternative embodiment, the service may perform the charging operations by contracting the settlement system directly. In this embodiment, the service transmits message to the TSMS 113 to restrict the tenant rights delegations if a charging error occurs. In all embodiments, the service 110A or the TSMS 113 communicate usage information and charging credential of a user of the service to a settlement system 117. The settlement system 117 performs the charging operations based on the information and the credentials. In some embodiments, the settlement system 117 is an entity that is external to the data center 108. For example, a banking authority, a system accepting and handling cryptocurrency, and credit card providers can be examples of settlement systems 117 that can be used. variety of charging credentials can be provided by tenants or services when they set up their accounts, and settlement proceeds through a backend payment processor.

Figure 6A:
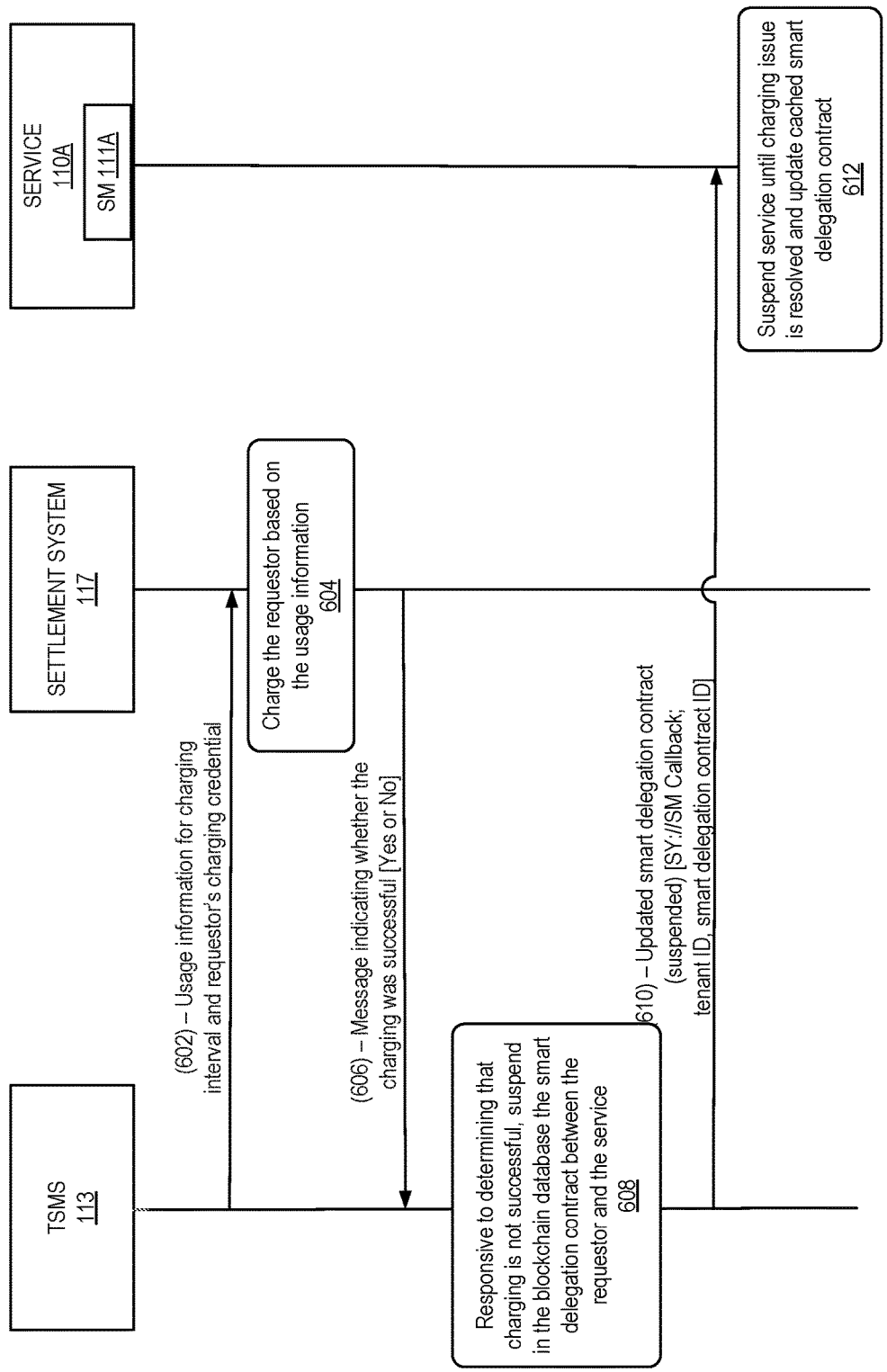
FIG. 6A illustrates a block diagram of a first set of exemplary operations for a usage charging process based on a first scenario in accordance with some embodiments.

FIG. 6A illustrates a block diagram of a first set of exemplary operations for a usage charging process based on a first scenario in accordance with some embodiments. The operations of FIG. 6A illustrate a first scenario (A), where the TSMS 113 communicates with the settlement system 117 to enable the charging. At operation 602, the TSMS 113 transmits usage information for a predetermined charging interval. This information is obtained by the TSMS 113 from the blockchain database 119 based on the usage tracked for a requestor. For example, the usage information can be the amount of resources (number of VMs, memory size, etc.) that the requestor 120 consumed during an interval of time. The interval of time can be determined based on a billing schedule set up for the account of the user at the time the user registered for the service. The billing schedule can be every month, every week, or at any other interval agreed upon by the requestor and the service 110A. At operation 604, upon receipt of the usage information, the settlement system 117 charges the requestor 120 based on the usage information and the charging credential. For example, a cryptocurrency account can be debited, a bank account of the requestor 120 can be debited, or a credit card charged with the amount corresponding to the user information. At operation 606, the settlement system 117 transmits a message indicating whether the charging was successful. If the charging is successful, the message includes a confirmation of the payment made. If the charging is not successful, the message includes an error.

Upon receipt of the message, if the charging was not successful, the TSMS 113 suspends the smart delegation contract between the service 110A and the requestor 120 in the blockchain database 119. The TSMS 113 further transmits, at operation 610, an updated smart delegation contract to the service 110A to inform the service 110A that the service should be suspended until the charging issue is resolved. At operation 612, the service 110A suspends the service offered to the requestor 120 and updates the cached smart delegation contract to be suspended. In some embodiments, the smart delegation contract remains suspended until the charging issue is resolved and a new message is received from the TSMS 113 indicating that the service can resume. When the requestor's rights delegation is suspended, the requestor is provided with an opportunity to pursue a mediation process with the service provider (e.g., entering new charging credentials through the TSMS 113), at which time the rights delegation will be restored. For example, the requestor can be informed via email, text message, notification, or by a phone call that there was a problem with their settlement and is requested to pursue remediation with the service provider. In some embodiments, if the charging issue is not resolved for a predetermined period of time the smart delegation contract can be revoked and the user can be requested to register for the service again in order to access the service.

Figure 6B:
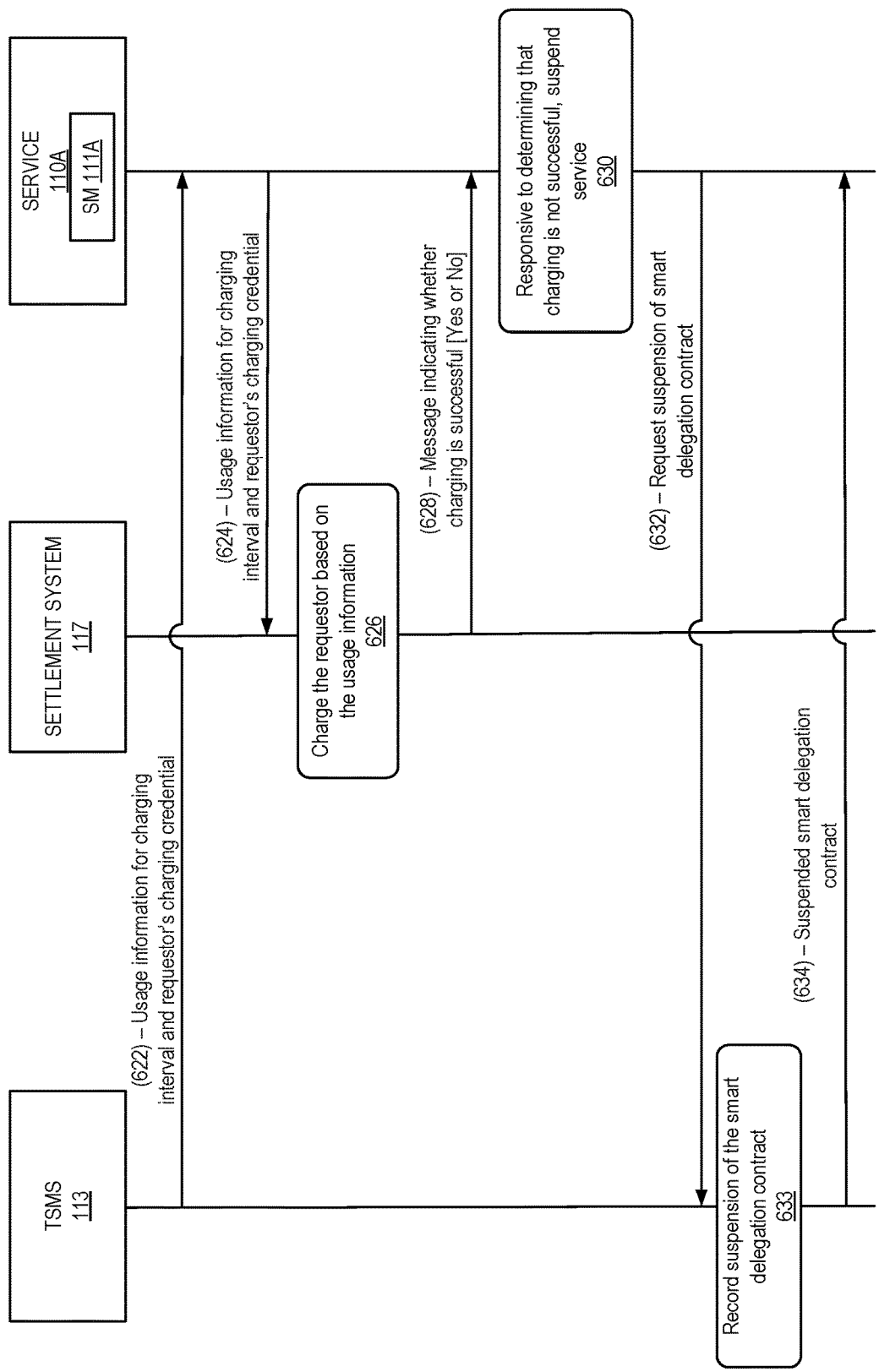
FIG. 6B illustrates a block diagram of a second set of exemplary operations for a usage charging process based on a second scenario in accordance with some embodiments.

FIG. 6B illustrates a block diagram of exemplary operations for a usage charging process based on a second scenario in accordance with some embodiments. The operations of Figure B illustrate a second scenario (B), where the service 110A, instead of the TSMS 113 as it was the case in scenario A, communicates with the settlement system 117 to enable the charging. At operation 622, the TSMS 113 transmits usage information for a predetermined charging interval to the service 110A. This information is obtained by the TSMS 113 from the blockchain database 119 based on the usage tracked for a requestor. For example, the usage information can be the amount of resources (number of VMs, memory size, etc.) that the requestor 120 consumed during an interval of time. The interval of time can be determined based on a billing schedule set up for the account of the user at the time the user registered for the service. The billing schedule can be every month, every week, or at any other interval agreed upon by the requestor and the service 110A. At operation 624, the service 110A transmits usage information for a predetermined charging interval to the settlement system 117.

At operation 626, upon receipt of the usage information, the settlement system 117 charges the requestor 120 based on the usage information and the charging credential. For example, a cryptocurrency account can be debited, a bank account of the requestor 120 can be debited, or a credit card charged with the amount corresponding to the user information. At operation 628, the settlement system 117 transmits a message indicating whether the charging was successful. If the charging is successful, the message includes a confirmation of the payment made. If the charging is not successful, the message includes an error.

Upon receipt of the message, if the charging was not successful, the service 110A suspends the service for the requestor 120 (operation 630) and transmits a request (operation 632) to the TSMS 113 to suspend the smart delegation contract stored in the blockchain database. The TSMS 113 suspends the smart delegation contract between the service 110A and the requestor 120 and records the suspension in the blockchain database 119, at operation 633. The TSMS 113 further transmits, at operation 634, an updated smart delegation contract to the service 110A to inform the service 110A that the smart delegation contract is suspended until the charging issue is resolved. For example, the requestor can be informed via email, text message, notification, or by a phone call that there was a problem with their settlement and is requested to pursue remediation with the service provider. In some embodiments, the smart delegation contract remains suspended until the charging issue is resolved and a new message is received from the TSMS 113 indicating that the service can resume. When the requestor's rights delegation is suspended, the requestor is provided with an opportunity to pursue a mediation process with the service provider (e.g., entering new charging credentials through the TSMS 113), at which time the rights delegation will be restored In some embodiments, if the charging issue is not resolved for a predetermined period of time the smart delegation contract can be revoked and the user can be requested to register for the service again in order to access the service.

In each of scenario A and scenario B, the TSMS 113 may periodically look up unsettled charging records for users and services and invoke the charging process either by communicating with the settlement system 117 directly or by enabling the service 110A to communicate with the settlement system 117.

In some embodiments, the following Solidity smart contract classes can be utilized in the charging system:

```
1. Usage Class
contract Usage {
    string attribute;
    uint256 amount;
    string lastRecordDate;
    function recordUsage(uint256 usage,
        string dateTime) { }
    { }
}
```

The Usage class provides a way to instantiate contract objects keeping track of some service attribute usage. The usage class includes the attribute, the amount of usage of that attribute, and the date at which the amount was last recorded.

```
2. Credential Interface Class
contract Credential {
    string credential;
    string paymentProcessorURL;
    Event CallProcessor(string myProcessor,
        uint256 myCharge);
    function charge(Usage[ ] myUsage)
        return (bool successp,
            string errMsg);
    function renew(string newCredential);
}
```

The Credential superclass provides a class for modelling charging credentials. Specific credential types should subclass it and populate the subclass with credential-specific information and implement the functions. For example, a credit card credential might put the card number into the string (credential) but have the expiration date, owner, and ccv number in subclass variables. The Event (CallProcessor) is for calling out to the payment processor. It can be the last line in the charge( ) function. If the credential is sensitive, it can be encrypted when put into the blockchain and decrypted prior to use when the Javascript or Python code implementing the Event handling is invoked.

```
3. Chargeable
contract Chargeable {
    Usage[ ] myUsage;
    Credential myCredential;
    Chargeable(Credential newCredential) { }
    addUsage(Usage newUsage) { }
    changeCredential(Credential newCredential)
    { }
}
```

Chargeable implements a charging record. Chargeable contains an array of Usage objects which are populated with chargeable attributes for a service, and a Credential object with a credential to charge the usage to.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

FIG. 7 illustrates a flow diagram of exemplary operations performed by a tenant and service management system of a data center for managing access to one or more services in accordance with some embodiments. At operation 702, the TSMS 113 receives an identification that uniquely identifies the service and a description of a set of one or more resources offered by the service. In some embodiments, the identification may include one or more identifiers for the service. In one embodiment, the identification includes a first identifier that is the cryptographic key of the service. The cryptographic key of the service is used to uniquely identify the service 110A in the blockchain database 119. In some embodiments, the cryptographic key can also be used to identify the service 110A for usage tracking and billing purposes. In other embodiments, in addition to the cryptographic key of the service 110A, the identification can further include a second identifier of the service (e.g., a name of the service in a top-level naming scheme) that is different than the cryptographic key of the service. The second identifier can be used for uniquely identifying the service when tracking usage of the service and billing the user for the usage. The second identifier can be in a human-readable format describing the service as opposed to the first identifier that is a public cryptographic key from the set of public/private keys generated for the service. In some embodiments, the second identifier can be in any other type of formats that is not a human-readable and is different from the first identifier used for identifying the service in the blockchain database.

At operation 704, the TSMS 113 records into a blockchain database a smart delegation contract between the service and the tenant and service management system, where the smart delegation contract includes the identification of the service, an identification of the tenant and service management system, and the description of the set of resources, and the smart delegation contract is cryptographically signed with a cryptographic private key of the service that is part of a cryptographic public-private key pair for the service and with a cryptographic private key of the tenant and service management system that is part of a cryptographic public-private key pair for the tenant and service management system. Flow then moves to operation 706, at which the TSMS 113 receives from a requestor a request to access the service. The TSMS 113 authorizes, at operation 708, the requestor to access the service based at least in part on the smart delegation contract between the service and the tenant and service management system. For example, the TSMS 113 may authorize the requestor to access the service based on the operations described in FIGS. 3A-C.

Figure 8:
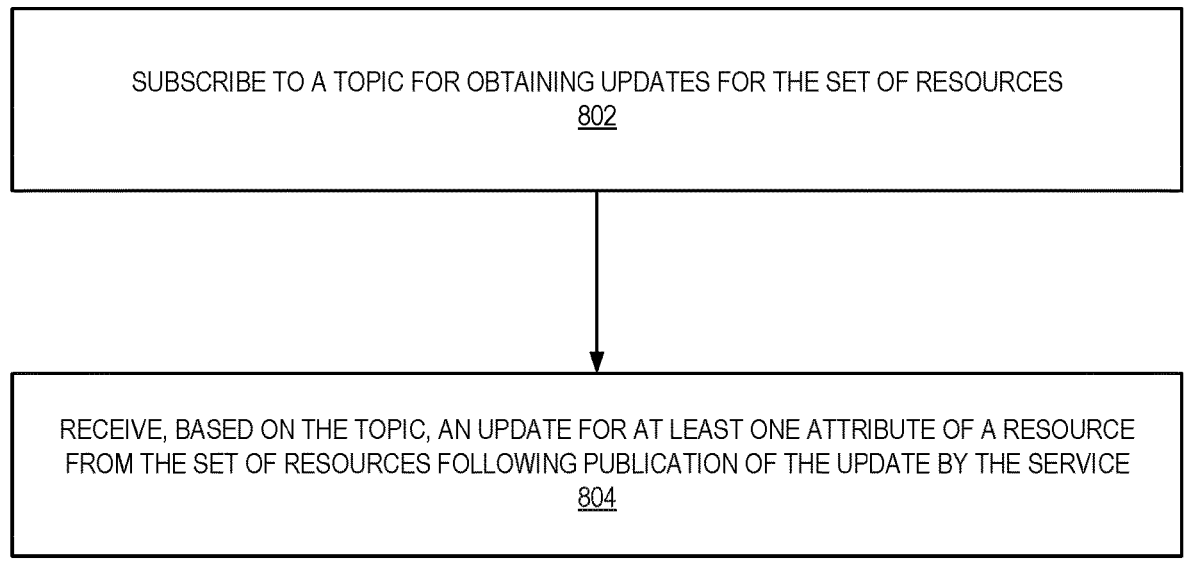
FIG. 8 illustrates a flow diagram of operations performed by the tenant and service management system for obtaining updates of the service in accordance with some embodiments.

FIG. 8 illustrates a flow diagram of operations performed by the TSMS for obtaining updates of the service in accordance with some embodiments. At operation 802, the TSMS 113 subscribes to a topic for obtaining updates for the set of resources. The TSMS 113 may subscribe to the topic by communicating with a publish/subscribe system (e.g., system 115) such as in operation 208A of FIG. 2A and operation 323 of FIG. 3B. At operation 804, the TSMS 113 receives based on the topic, an update for at least one attribute of a resource from the set of resources following publication of the update by the service. For example, the TSMS 113 may receive an updated attribute for a service resource as illustrated in FIG. 2B operation 214.

Figure 9:
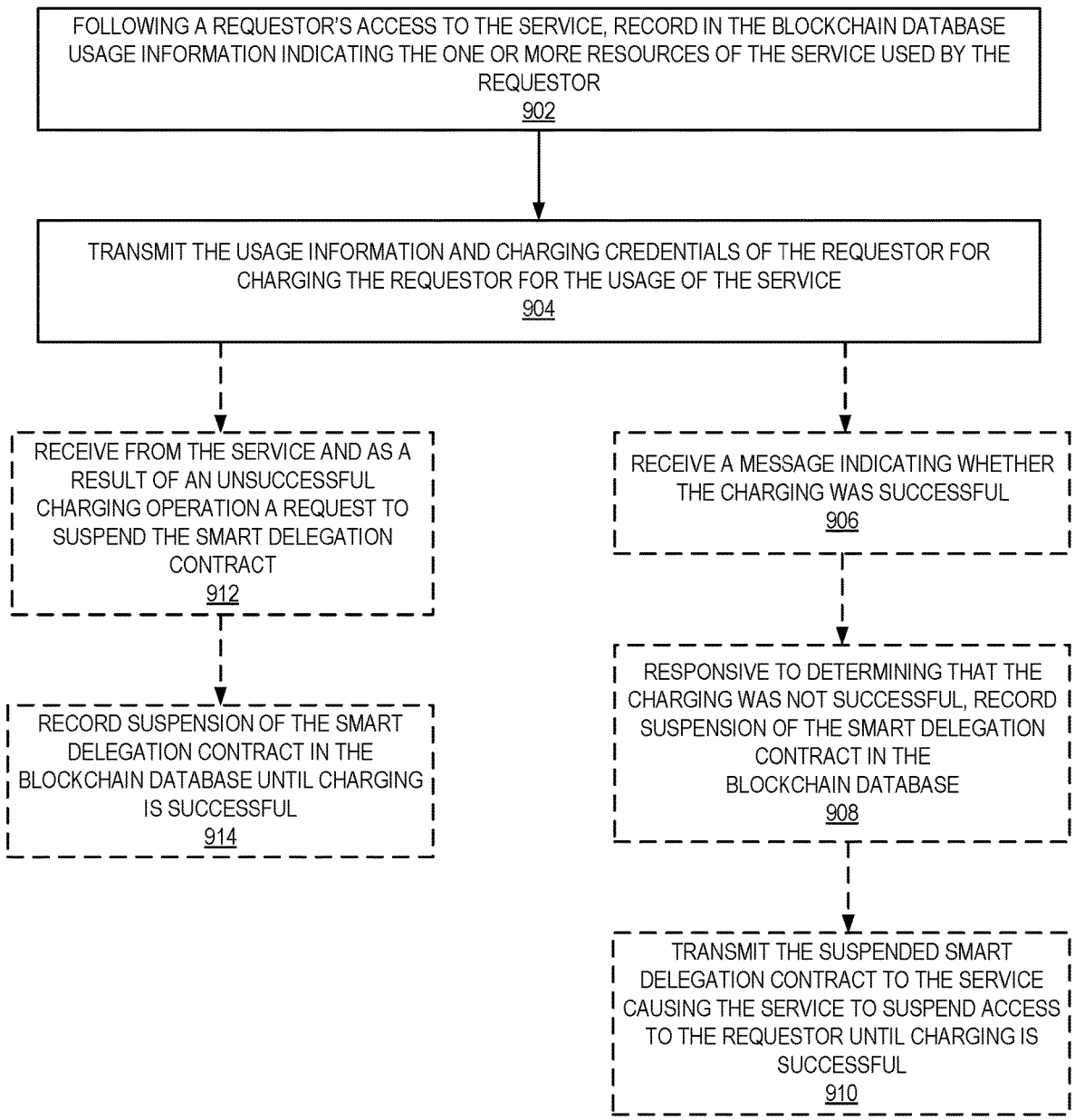
FIG. 9 illustrates a flow diagram of exemplary operations for tracking usage of the service by a requestor in accordance with some embodiments.

FIG. 9 illustrates a flow diagram of exemplary operations for tracking usage of the service by a requestor in accordance with some embodiments. Following a requestor's access to the service, the TSMS 113 records in the blockchain database, at operation 902, usage information indicating the one or more resources of the service used by the requestor. In some embodiments, the resource usage tracking is performed as described with reference to FIG. 4. In some embodiments, the TSMS 113 may transmit, at operation 904, the usage information and charging credentials of the requestor 120 for charging the requestor for the usage of the service. The charging for the service usage can be performed through at least one of two scenarios, operations 906-910 in scenario A, and operations 912-914 in scenario B.

At operation 906, the TSMS 113 receives a message indicating whether the charging was successful. Responsive to determining that the charging was not successful, the TSMS 113 suspends, at operation 908, the smart delegation contract in the blockchain database; and transmits, at operation 910, the suspended smart delegation contract to the service causing the service to suspend access to the requestor until charging is successful.

Alternatively, at operation 912, the TSMS 113 receives from the service, as a result of an unsuccessful charging operation, a request to suspend the smart delegation contract; and at operation 914, suspends the smart delegation contract and records the suspension in the blockchain database until charging is successful.

Figure 10:
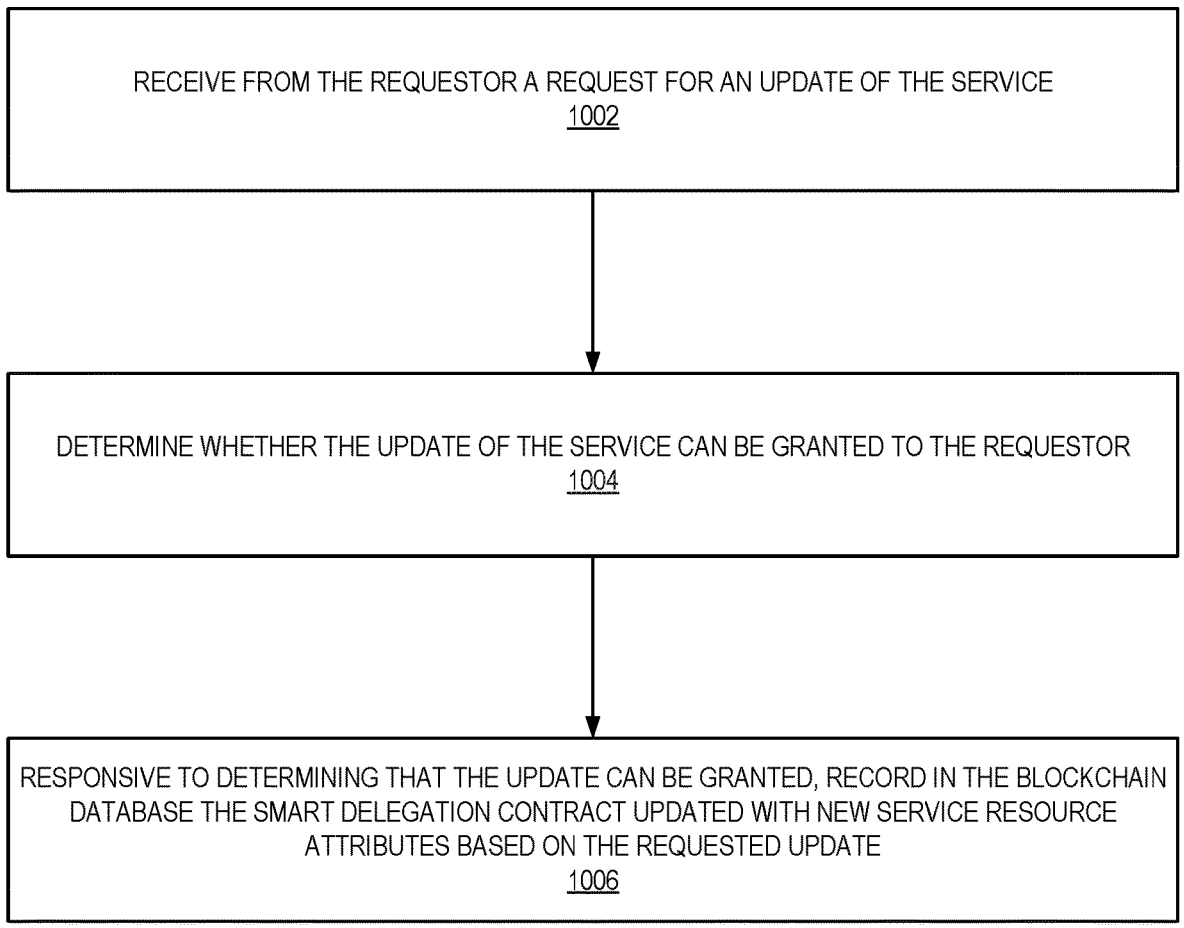
FIG. 10 illustrates a flow diagram of exemplary operations for updating a service for a requestor in accordance with some embodiments.

FIG. 10 illustrates a flow diagram of exemplary operations for updating a service for a requestor in accordance with some embodiments. For example, the operations of the flow diagram can be performed as described with reference to FIG. 5. At operation 1002, the TSMS 113 receives from the requestor 120 a request for an update of the service. The requestor 120 may request additional resources from the service 110A (such as an increase in the number of VMs allocated, an increase in the amount of storage memory needed, or processing resource, etc.). The TSMS 113 determines, at operation 1004, whether the update of the service can be granted to the requestor. The TSMS 113 may look up local information about quotas that can be attributed to each requestor or alternatively may communicate with the service 110A to determine that the additional resources can be granted to the requestor 120. Responsive to determining that the update can be granted, the TSMS 113 records (operation 1006) in the blockchain database the smart delegation contract updated with new service resource attributes based on the requested update.

The use of smart contracts to enable service registration, service access tracking and charging of service usage provides several advantages with respect to centralized databases. The embodiments described herein enable the creation and recordation of a smart delegation contract between a service and a cloud data center, and the sub-delegation of this contract to a requestor of a service and allow for increased scalability and resilience. The embodiments enable the participation of multiple parties (e.g., the cloud infrastructure, the service providers built on top of the cloud infrastructure, tenants (e.g., organizations) and sub-tenants (e.g., employees, customers)) in complex business ecosystems. The embodiments herein enable fine-grained tracking of service usage by the tenant, including charging the tenant according to this usage. Tenant quota update can be performed upon tenant request.

The embodiments herein provide a significant advantage over other techniques where a centralized database stores access information, by relying on the immutable aspect of the blockchain database storing the contracts Immutability of the smart delegation contracts means that in case of a dispute, the blockchain database can be audited by a third party to determine the series of actions and events that occurred and that were agreed upon between the requestor and the service at the time of the service being requested. Regulators, auditors, and mediators can be given permission for read-only access to the blockchain database in order to monitor and audit the activity. Industries which are heavily regulated, like financial services and health care services, can benefit from such an immutable system. In addition, the embodiments presented herein are particularly well suited to cases where multiple parties form a business ecosystem in which they cooperate in some cases and compete in others. In some embodiments, the tenant and service management system is run by the cloud provider as part of the cloud management system.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video, etc.). In the embodiments described above the components of the system 100 can be implemented on one or more network devices coupled in a network. For example, each of the services, the service access authorization manager 112, the tenant authentication manager 114, the TSMS 113, the publish/subscribe system 115 and the blockchain platform 118 can be implemented on one ND or distributed over multiple NDs of the data center 108. While the blockchain database 119 is illustrated as a single entity part of the blockchain platform 118, one or ordinary skill in the art would understand that the blockchain database is a permissioned, distributed ledger that is implemented on multiple network devices. Similarly, the tenants 102A-N may be abstract organization for which access to the service is enabled through the use of one or more network devices to access the resources and services of the data center 108.

FIG. 11A illustrates connectivity between network devices (NDs) within an exemplary network, as well as three exemplary implementations of the NDs, according to some embodiments of the invention. FIG. 11A shows NDs 1100A-H, and their connectivity by way of lines between 1100A-1100B, 1100B-1100C, 1100C-1100D, 1100D-1100E, 1100E-1100F, 1100F-1100G, and 1100A-1100G, as well as between 1100H and each of 1100A, 1100C, 1100D, and 1100G. These NDs are physical devices, and the connectivity between these NDs can be wireless or wired (often referred to as a link). An additional line extending from NDs 1100A, 1100E, and 1100F illustrates that these NDs act as ingress and egress points for the network (and thus, these NDs are sometimes referred to as edge NDs; while the other NDs may be called core NDs).

Two of the exemplary ND implementations in FIG. 11A are: 1) a special-purpose network device 1102 that uses custom application—specific integrated—circuits (ASICs) and a special-purpose operating system (OS); and 2) a general purpose network device 1104 that uses common off-the-shelf (COTS) processors and a standard OS.

The special-purpose network device 1102 includes networking hardware 1110 comprising a set of one or more processor(s) 1112, forwarding resource(s) 1114 (which typically include one or more ASICs and/or network processors), and physical network interfaces (NIs) 1116 (through which network connections are made, such as those shown by the connectivity between NDs 1100A-H), as well as non-transitory machine readable storage media 1118 having stored therein networking software 1120. During operation, the networking software 1120 may be executed by the networking hardware 1110 to instantiate a set of one or more networking software instance(s) 1122. Each of the networking software instance(s) 1122, and that part of the networking hardware 1110 that executes that network software instance (be it hardware dedicated to that networking software instance and/or time slices of hardware temporally shared by that networking software instance with others of the networking software instance(s) 1122), form a separate virtual network element 1130A-R. Each of the virtual network element(s) (VNEs) 1130A-R includes a control communication and configuration module 1132A-R (sometimes referred to as a local control module or control communication module) and forwarding table(s) 1134A-R, such that a given virtual network element (e.g., 1130A) includes the control communication and configuration module (e.g., 1132A), a set of one or more forwarding table(s) (e.g., 1134A), and that portion of the networking hardware 1110 that executes the virtual network element (e.g., 1130A).

The special-purpose network device 1102 is often physically and/or logically considered to include: 1) a ND control plane 1124 (sometimes referred to as a control plane) comprising the processor(s) 1112 that execute the control communication and configuration module(s) 1132A-R; and 2) a ND forwarding plane 1126 (sometimes referred to as a forwarding plane, a data plane, or a media plane) comprising the forwarding resource(s) 1114 that utilize the forwarding table(s) 1134A-R and the physical NIs 1116. By way of example, where the ND is a router (or is implementing routing functionality), the ND control plane 1124 (the processor(s) 1112 executing the control communication and configuration module(s) 1132A-R) is typically responsible for participating in controlling how data (e.g., packets) is to be routed (e.g., the next hop for the data and the outgoing physical NI for that data) and storing that routing information in the forwarding table(s) 1134A-R, and the ND forwarding plane 1126 is responsible for receiving that data on the physical NIs 1116 and forwarding that data out the appropriate ones of the physical NIs 1116 based on the forwarding table(s) 1134A-R.

FIG. 11B illustrates an exemplary way to implement the special-purpose network device 1102 according to some embodiments of the invention. FIG. 11B shows a special-purpose network device including cards 1138 (typically hot pluggable). While in some embodiments the cards 1138 are of two types (one or more that operate as the ND forwarding plane 1126 (sometimes called line cards), and one or more that operate to implement the ND control plane 1124 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1136 (e.g., a first full mesh coupling the line cards and a second full mesh coupling all of the cards).

Returning to FIG. 11A, the general purpose network device 1104 includes hardware 1140 comprising a set of one or more processor(s) 1142 (which are often COTS processors) and physical NIs 1146, as well as non-transitory machine readable storage media 1148 having stored therein software 1150. During operation, the processor(s) 1142 execute the software 1150 to instantiate one or more sets of one or more applications 1164A-R. While one embodiment does not implement virtualization, alternative embodiments may use different forms of virtualization. For example, in one such alternative embodiment the virtualization layer 1154 represents the kernel of an operating system (or a shim executing on a base operating system) that allows for the creation of multiple instances 1162A-R called software containers that may each be used to execute one (or more) of the sets of applications 1164A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 1154 represents a hypervisor (sometimes referred to as a virtual machine monitor (VMM)) or a hypervisor executing on top of a host operating system, and each of the sets of applications 1164A-R is run on top of a guest operating system within an instance 1162A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1140, directly on a hypervisor (in which case the unikernel is sometimes described as running within a LibOS virtual machine), or in a software container, embodiments can be implemented fully with unikernels running directly on a hypervisor represented by virtualization layer 1154, unikernels running within software containers represented by instances 1162A-R, or as a combination of unikernels and the above-described techniques (e.g., unikernels and virtual machines both run directly on a hypervisor, unikernels and sets of applications that are run in different software containers).

The instantiation of the one or more sets of one or more applications 1164A-R, as well as virtualization if implemented, are collectively referred to as software instance(s) 1152. Each set of applications 1164A-R, corresponding virtualization construct (e.g., instance 1162A-R) if implemented, and that part of the hardware 1140 that executes them (be it hardware dedicated to that execution and/or time slices of hardware temporally shared), forms a separate virtual network element(s) 1160A-R.

The virtual network element(s) 1160A-R perform similar functionality to the virtual network element(s) 1130A-R—e.g., similar to the control communication and configuration module(s) 1132A and forwarding table(s) 1134A (this virtualization of the hardware 1140 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 1162A-R corresponding to one VNE 1160A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1162A-R to VNEs also apply to embodiments where such a finer level of granularity and/or unikernels are used.

In certain embodiments, the virtualization layer 1154 includes a virtual switch that provides similar forwarding services as a physical Ethernet switch. Specifically, this virtual switch forwards traffic between instances 1162A-R and the physical NI(s) 1146, as well as optionally between the instances 1162A-R; in addition, this virtual switch may enforce network isolation between the VNEs 1160A-R that by policy are not permitted to communicate with each other (e.g., by honoring virtual local area networks (VLANs)).

The third exemplary ND implementation in FIG. 11A is a hybrid network device 1106, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 1102) could provide for para-virtualization to the networking hardware present in the hybrid network device 1106.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a tenant and service management system of a data center of managing access to one or more services by a plurality of users, the method comprising:
   receiving an identification that uniquely identifies a service and a description of a set of one or more resources offered by the service;
   recording into a blockchain database a smart delegation contract between the service and the tenant and service management system, wherein the smart delegation contract includes the identification of the service, an identification of the tenant and service management system, and the description of the set of resources, and the smart delegation contract is cryptographically signed with a cryptographic private key of the service that is part of a cryptographic public-private key pair for the service and with a cryptographic private key of the tenant and service management system that is part of a cryptographic public-private key pair for the tenant and service management system;
   receiving from a requestor a request to access the service;
   authorizing the requestor to access the service based at least in part on the smart delegation contract between the service and the tenant and service management system;
   recording in the blockchain database usage information indicating the one or more resources of the service used by the requestor; and
   transmitting the usage information and charging credentials of the requestor for charging the requestor for the usage of the service.

2. The method of claim 1, wherein the method further comprises:
   subscribing to a topic for obtaining updates for the set of resources, and receiving, based on the topic, an update for at least one attribute of a resource from the set of resources following publication of the update by the service.

3. The method of claim 1 further comprising:
   receiving a message indicating whether the charging was successful;
   responsive to determining that the charging was not successful, recording suspension of the smart delegation contract in the blockchain database; and
   transmitting the suspended smart delegation contract to the service causing the service to suspend access to the requestor until charging is successful.

4. The method of claim 1 further comprising:
   receiving from the service and as a result of an unsuccessful charging operation a request to suspend the smart delegation contract; and
   recording suspension of the smart delegation contract in the blockchain database until charging is successful.

5. The method of claim 1 further comprising:
   receiving from the requestor a request for an update of the service;
   determining whether the update of the service can be granted to the requestor; and
   responsive to determining that the update can be granted, recording in the blockchain database the smart delegation contract updated with new service resource attributes based on the requested update.

6. A server including a tenant and service management system in a data center for managing access to one or more services by a plurality of users, the server comprising:
   a non-transitory computer readable storage medium to store instructions; and
   a processor coupled with the non-transitory computer readable storage medium to process the stored instructions to:
      receive an identification that uniquely identifies a service and a description of a set of one or more resources offered by the service;
      record into a blockchain database a smart delegation contract between the service and the tenant and service management system, wherein the smart delegation contract includes the identification of the service, an identification of the tenant and service management system, and the description of the set of resources, and the smart delegation contract is cryptographically signed with a cryptographic private key of the service that is part of a cryptographic public-private key pair for the service and with a cryptographic private key of the tenant and service management system that is part of a cryptographic public-private key pair for the tenant and service management system, wherein the description of the set of resources includes for each resource a usage quota part of one or more attributes defined for the resource;

receive from a requestor a request to access the service;

authorize the requestor to access the service based at least in part on the smart delegation contract between the service and the tenant and service management system; and record in the blockchain database usage information indicating the one or more resources of the service used by the requestor.

7. The server of claim 6, wherein the processor is further to:

subscribe to a topic for obtaining updates for the set of resources, and receive, based on the topic, an update for at least one attribute of a resource from the set of resources following publication of the update by the service.

8. The server of claim 6, wherein the processor is further to:

transmit the usage information and charging credentials of the requestor for charging the requestor for the usage of the service.

9. The server of claim 8, wherein the processor is further to:

receive a message indicating whether the charging was successful;

responsive to determining that the charging was not successful, record suspension of the smart delegation contract in the blockchain database; and transmit the suspended smart delegation contract to the service causing the service to suspend access to the requestor until charging is successful.

10. The server of claim 8, wherein the processor is further to:

receive from the service and as a result of an unsuccessful charging operation a request to suspend the smart delegation contract; and record suspension of the smart delegation contract in the blockchain database until charging is successful.

11. The server of claim 6, wherein the processor is further to:

receive from the requestor a request for an update of the service;

determine whether the update of the service can be granted to the requestor; and responsive to determining that the update can be granted, record in the blockchain database the smart delegation contract updated with new service resource attributes based on the requested update.

12. A non-transitory machine-readable storage medium comprising computer program code which when executed by a processor of a server including a tenant and service management system in a data center for managing access to one or more services by a plurality of users causes the server to perform operations comprising:

receiving an identification that uniquely identifies a service and a description of a set of one or more resources offered by the service;

recording into a blockchain database a smart delegation contract between the service and the tenant and service management system, wherein the smart delegation contract includes the identification of the service, an identification of the tenant and service management system, and the description of the set of resources, and the smart delegation contract is cryptographically signed with a cryptographic private key of the service that is part of a cryptographic public-private key pair for the service and with a cryptographic private key of the tenant and service management system that is part of a cryptographic public-private key pair for the tenant and service management system, wherein the description of the set of resources includes for each resource a usage quota part of one or more attributes defined for the resource;

receiving from a requestor a request to access the service;

authorizing the requestor to access the service based at least in part on the smart delegation contract between the service and the tenant and service management system; and recording in the blockchain database usage information indicating the one or more resources of the service used by the requestor.

13. The non-transitory machine-readable storage medium of claim 12, wherein the operations further comprise:

subscribing to a topic for obtaining updates for the set of resources, and receiving, based on the topic, an update for at least one attribute of a resource from the set of resources following publication of the update by the service.

14. The non-transitory machine-readable storage medium of claim 12, wherein the operations further comprise:

transmitting the usage information and charging credentials of the requestor for charging the requestor for the usage of the service.

15. The non-transitory machine-readable storage medium of claim 14, wherein the operations further comprise:

receiving a message indicating whether the charging was successful;

responsive to determining that the charging was not successful, recording suspension of the smart delegation contract in the blockchain database; and transmitting the suspended smart delegation contract to the service causing the service to suspend access to the requestor until charging is successful.

16. The non-transitory machine-readable storage medium of claim 14, wherein the operations further comprise:

receiving from the service and as a result of an unsuccessful charging operation a request to suspend the smart delegation contract; and recording suspension of the smart delegation contract in the blockchain database until charging is successful.

17. The non-transitory machine-readable storage medium of claim 12, wherein the operations further comprise:

receiving from the requestor a request for an update of the service;

determining whether the update of the service can be granted to the requestor; and responsive to determining that the update can be granted, recording in the blockchain database the smart delegation contract updated with new service resource attributes based on the requested update.

* * * * *